United States Patent
Ishida et al.

(10) Patent No.: US 12,292,453 B2
(45) Date of Patent: May 6, 2025

(54) AUTOMATIC ANALYSIS APPARATUS

(71) Applicant: Hitachi High-Tech Corporation, Tokyo (JP)

(72) Inventors: Takeshi Ishida, Tokyo (JP); Yoshihiro Yamashita, Tokyo (JP); Hisashi Yabutani, Tokyo (JP); Koshin Hamasaki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 596 days.

(21) Appl. No.: 16/764,178

(22) PCT Filed: Oct. 31, 2018

(86) PCT No.: PCT/JP2018/040545
§ 371 (c)(1),
(2) Date: May 14, 2020

(87) PCT Pub. No.: WO2019/107055
PCT Pub. Date: Jun. 6, 2019

(65) Prior Publication Data
US 2020/0378994 A1    Dec. 3, 2020

(30) Foreign Application Priority Data
Dec. 1, 2017    (JP) .................. 2017-231975

(51) Int. Cl.
*G01N 35/00* (2006.01)
(52) U.S. Cl.
CPC .................. *G01N 35/00663* (2013.01); *G01N 2035/00673* (2013.01)
(58) Field of Classification Search
CPC ... G01N 35/00663; G01N 2035/00673; G01N 35/00613; G01N 35/00594; G01N 35/00584
See application file for complete search history.

(56) References Cited

U.S. PATENT DOCUMENTS 9,630,859 B2 *   4/2017   Chen .................. C02F 1/325
9,707,306 B2 *   7/2017   Farren .................. A61L 2/10
(Continued)

FOREIGN PATENT DOCUMENTS

EP    3 470 849 A1    4/2019
EP    3 702 787 A1    9/2020
(Continued)

OTHER PUBLICATIONS

Veryst Engineering, Active Mixing in a Microwell by Repetitive Pipetting, Retrieved Dec. 31, 2022, https://www.veryst.com/case-studies/active-mixing-microwell-repetitive-pipetting (Year: 2022).*
(Continued)

*Primary Examiner* — Paul S Hyun
*Assistant Examiner* — Tingchen Shi
(74) *Attorney, Agent, or Firm* — Crowell & Moring LLP

(57) ABSTRACT

The object of the invention is to provide an automatic analysis apparatus which is capable of both sterilizing a reagent and suppressing property variations in the reagent. Provided is an automatic analysis apparatus including a reagent vessel which holds a reagent; a suction nozzle which sucks the reagent; an analysis unit which executes an analysis operation by adding a reagent sucked from the reagent vessel to a specimen via the suction nozzle; an ultraviolet ray source which sterilizes a reagent by ultraviolet irradiation; and an electrode or a substrate which supplies electric power to the ultraviolet ray source, in which a heat insulation portion is arranged between a reagent in the suction nozzle and the ultraviolet ray source and the electrode or the substrate, or, it is isolated between a reagent in the suction nozzle and the ultraviolet ray source and the electrode or the substrate.

20 Claims, 24 Drawing Sheets

(56) References Cited

U.S. PATENT DOCUMENTS

| | | | | |
|---|---|---|---|---|
| 2003/0215357 A1* | 11/2003 | Malterer | ............... | G01N 35/028 |
| | | | | 422/50 |
| 2007/0037135 A1* | 2/2007 | Barnes | ................... | G01N 21/51 |
| | | | | 356/73 |
| 2009/0250626 A1 | 10/2009 | Schlesser et al. | | |
| 2011/0008825 A1* | 1/2011 | Ingber | ................ | G01N 21/0303 |
| | | | | 435/288.1 |
| 2012/0045826 A1* | 2/2012 | Yantz | ............... | A61B 5/150221 |
| | | | | 422/69 |
| 2013/0319915 A1 | 12/2013 | Gellibolian et al. | | |
| 2016/0107904 A1 | 4/2016 | Rajagopalan et al. | | |
| 2018/0156734 A1* | 6/2018 | Blanch | .................. | G01J 3/0208 |

FOREIGN PATENT DOCUMENTS

| | | | |
|---|---|---|---|
| JP | 63-163168 | A | 7/1988 |
| JP | 1-147370 | A | 6/1989 |
| JP | 2-42641 | U | 3/1990 |
| JP | 5-318825 | A | 12/1993 |
| JP | 11-169440 | A | 6/1999 |
| JP | 3146976 | U | 12/2008 |
| JP | 2013-75257 | A | 4/2013 |
| JP | 2014-233712 | A | 12/2014 |
| JP | 2016-78895 | A | 5/2016 |
| JP | 2016-525906 | A | 9/2016 |
| JP | 2017-87153 | A | 5/2017 |

OTHER PUBLICATIONS

International Preliminary Report on Patentability (PCT/IB/338 & PCT/EPEA/409) issued in PCT Application No. PCT/JP2018/040545 dated Jun. 4, 2020 (12 pages).

International Search Report (PCT/ISA/210) issued in PCT Application No. PCT/JP2018/040545 dated Dec. 25, 2018 with English translation (five pages).

Japanese-language Written Opinion (PCT/ISA/237) issued in PCT Application No. PCT/JP2018/040545 dated Dec. 25, 2018 (seven pages).

International Preliminary Report on Patentability (PCT/IPEA/409) issued in PCT Application No. PCT/JP2018/040545 dated Feb. 28, 2020 (five pages).

Extended European Search Report issued in European Application No. 18882381.9 dated Jun. 21, 2021 (12 pages).

\* cited by examiner

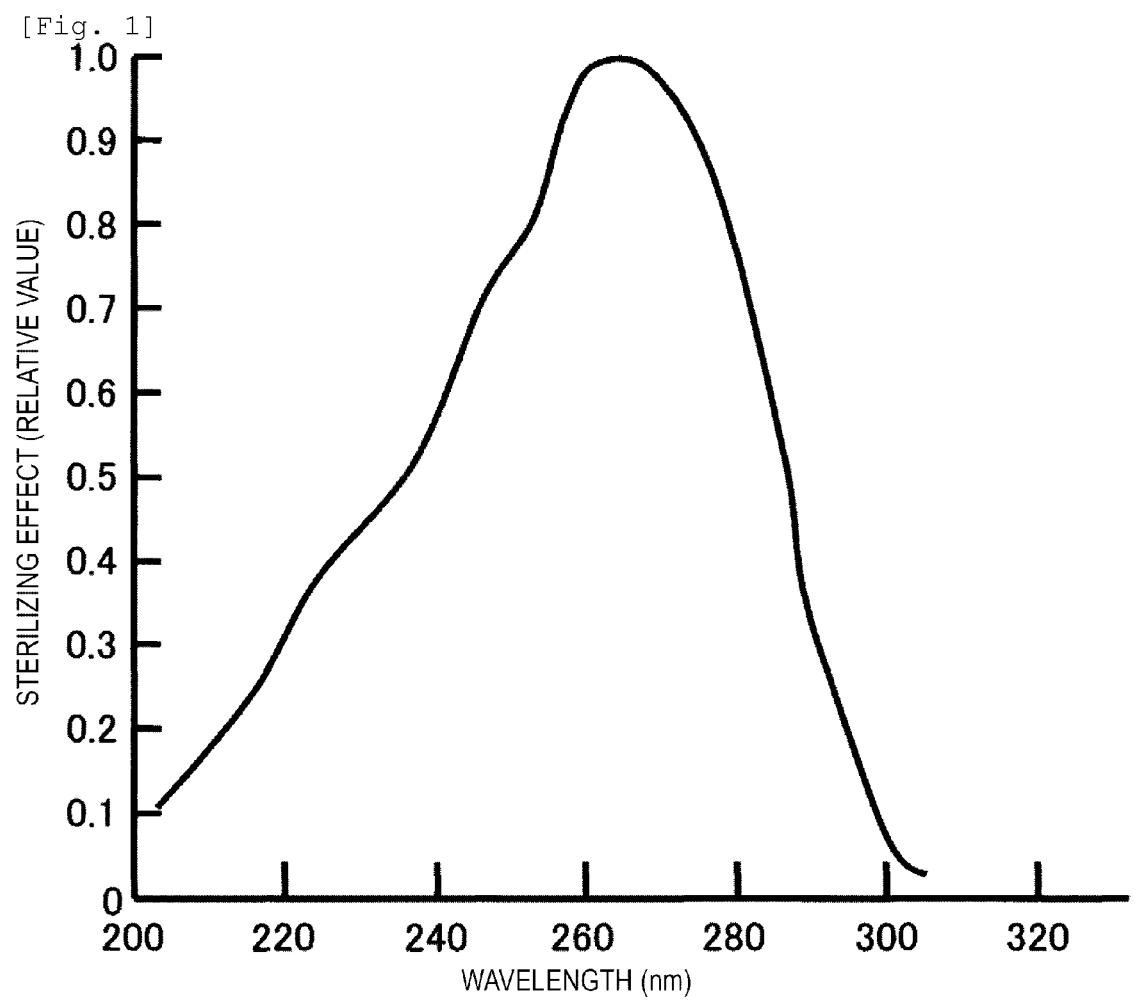
[Fig. 1]
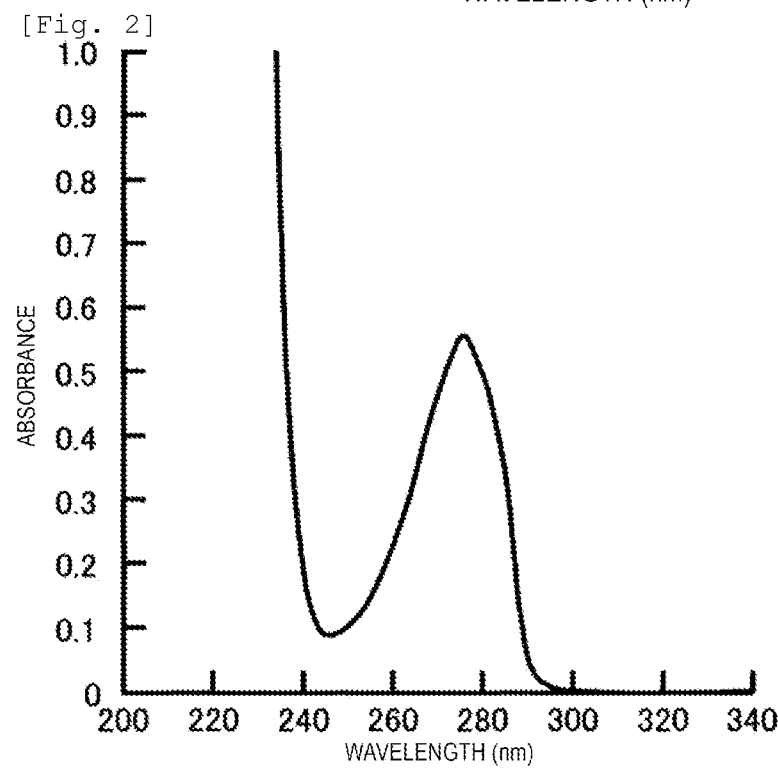
[Fig. 2]

[Fig. 3]
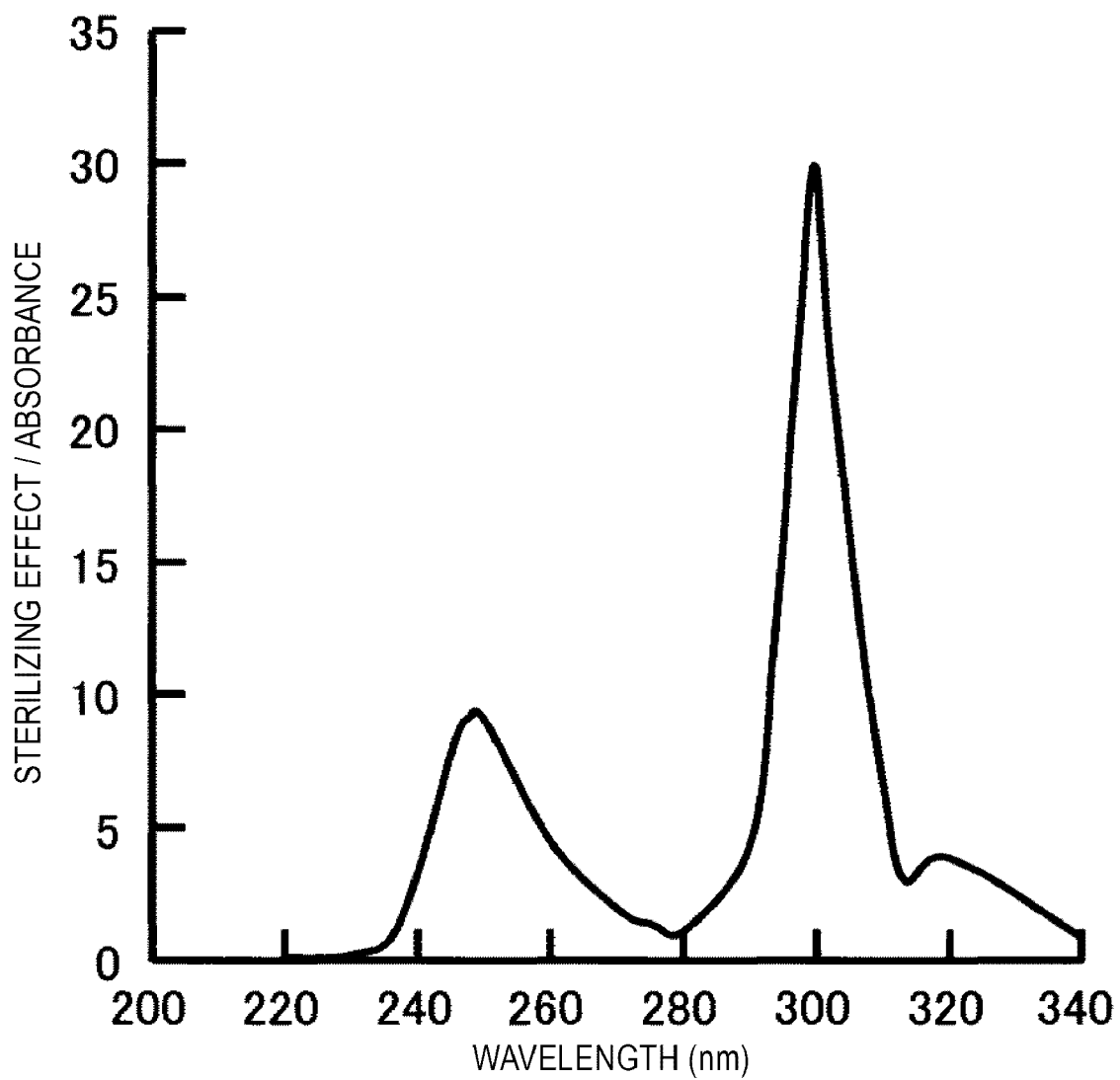

[Fig. 4A]
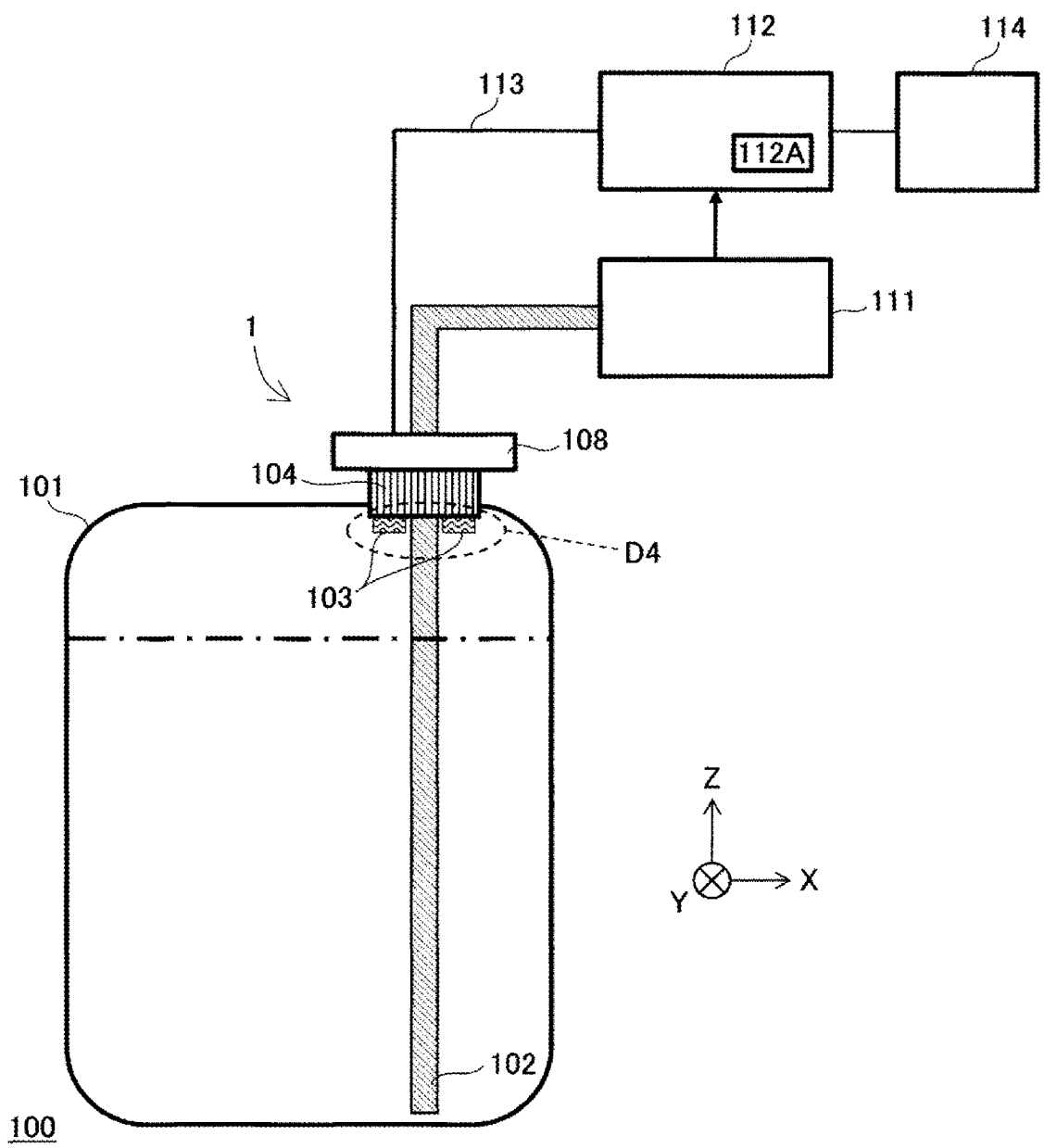

[Fig. 4B]
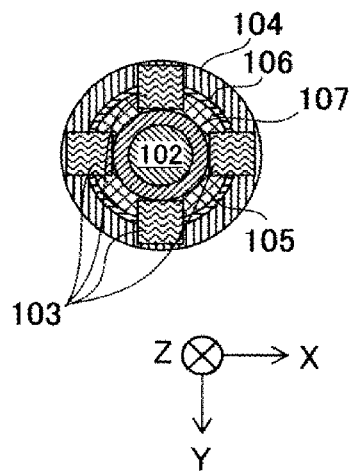
[Fig. 4C]
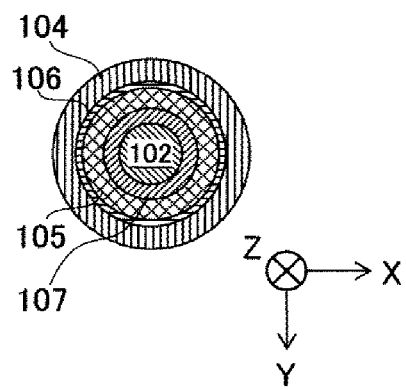
[Fig. 4D]
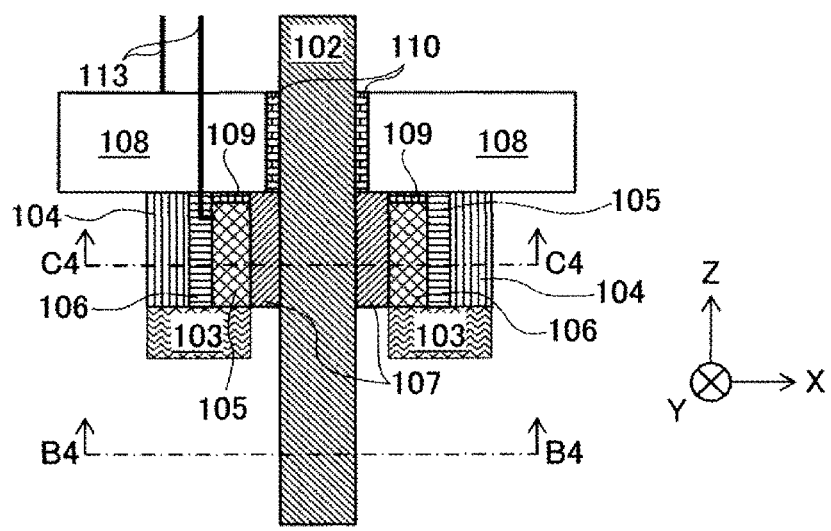

[Fig. 5A]
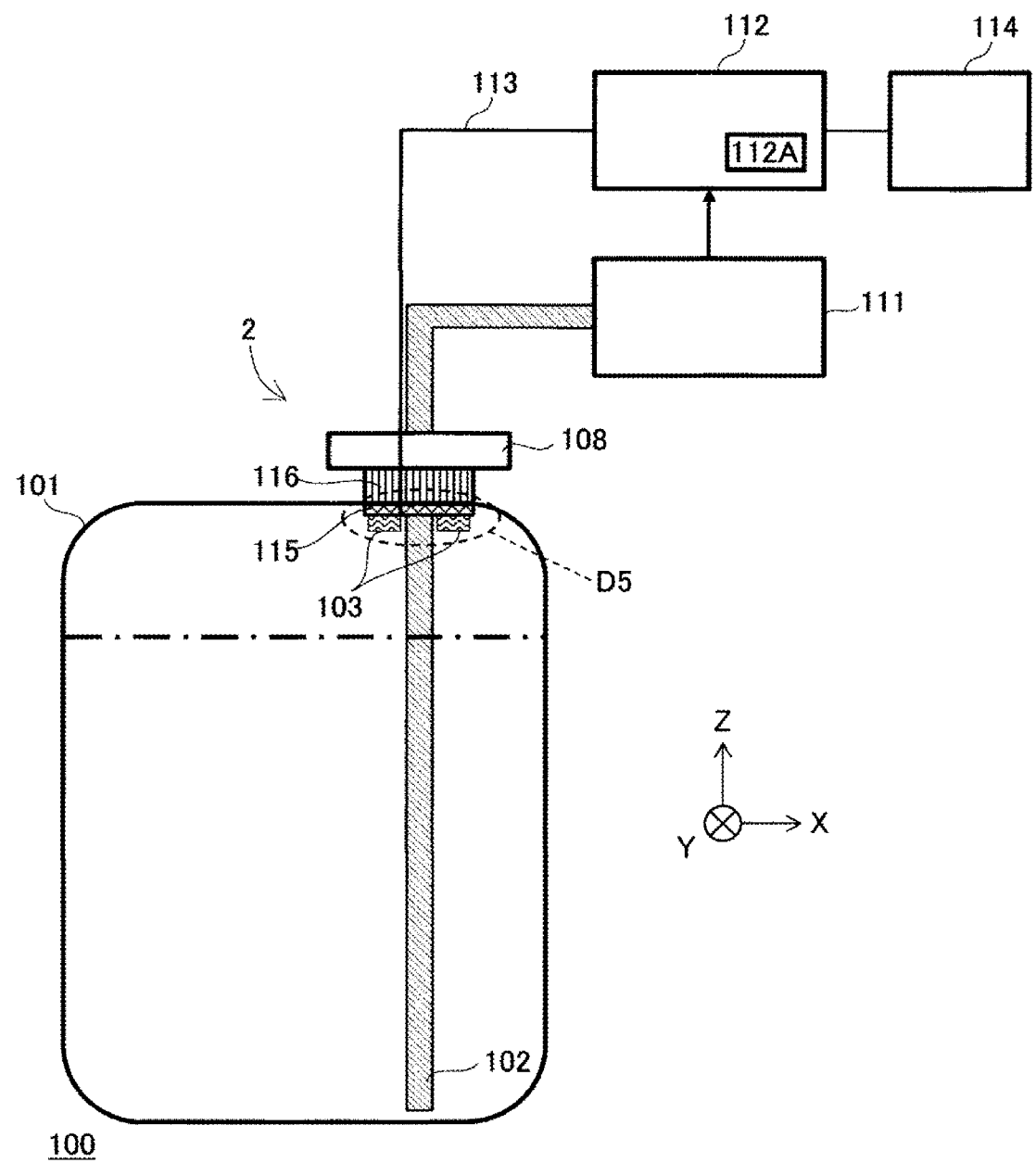

[Fig. 5B]
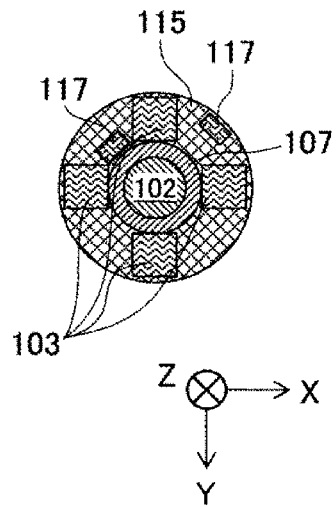
[Fig. 5C]
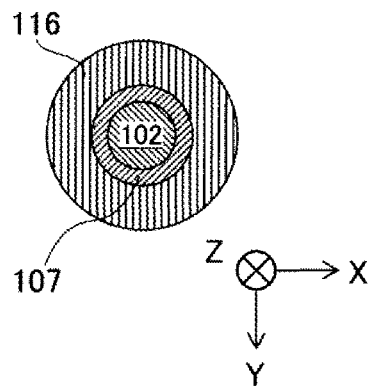
[Fig. 5D]
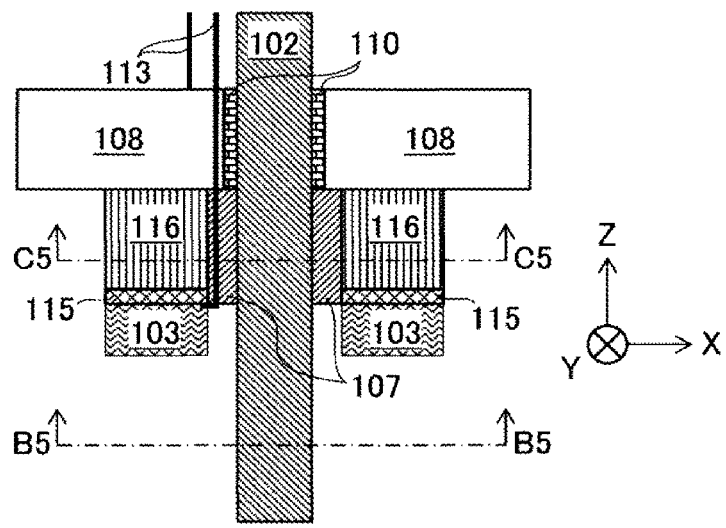

[Fig. 6A]
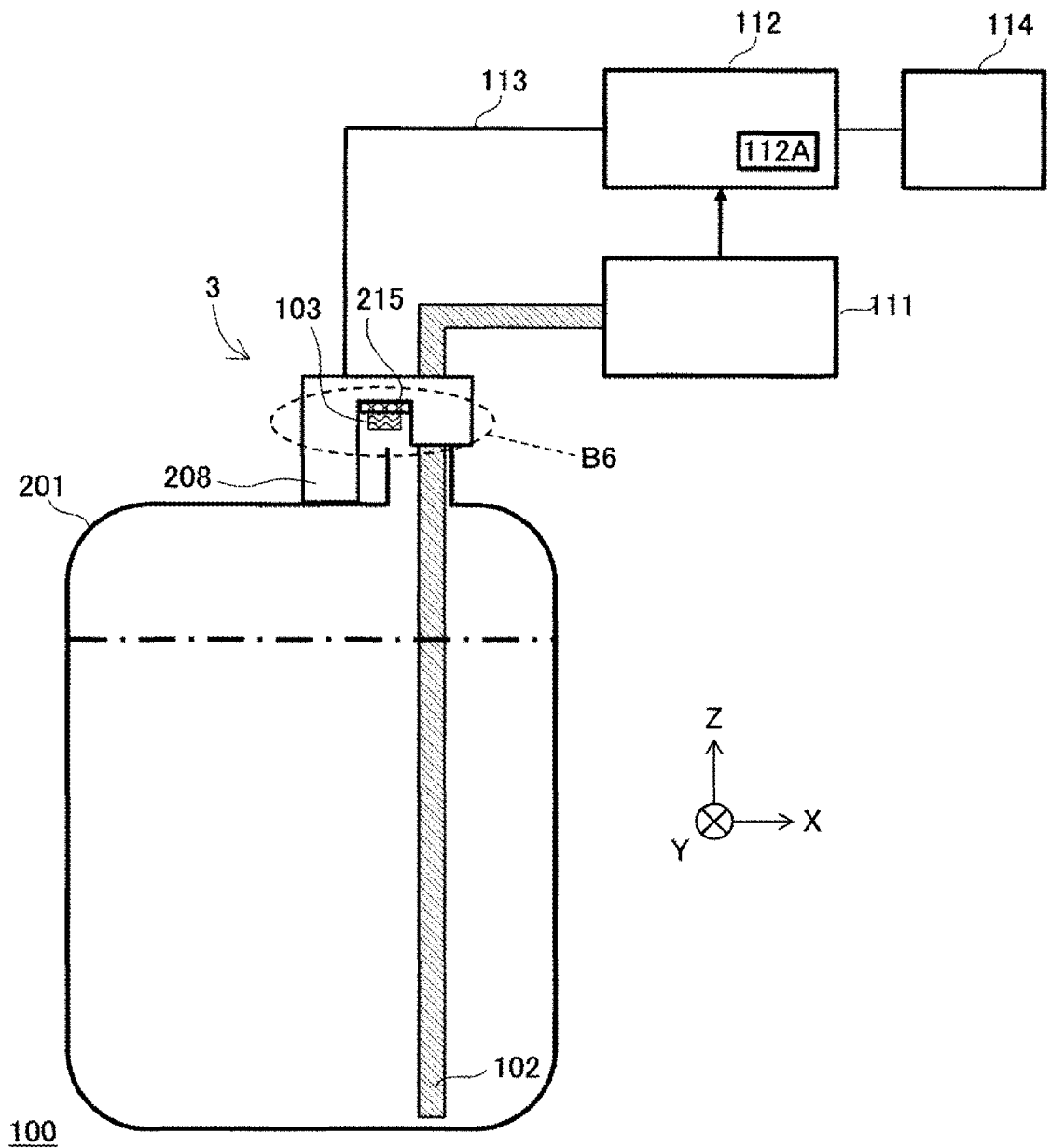

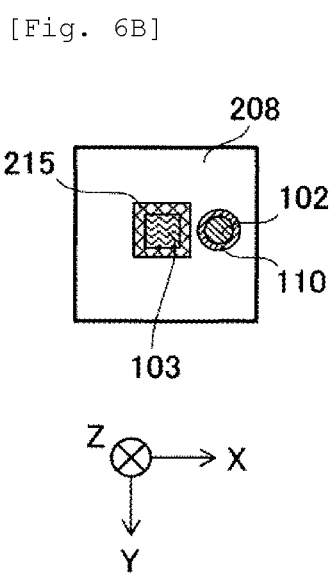
[Fig. 6B]

[Fig. 7A]
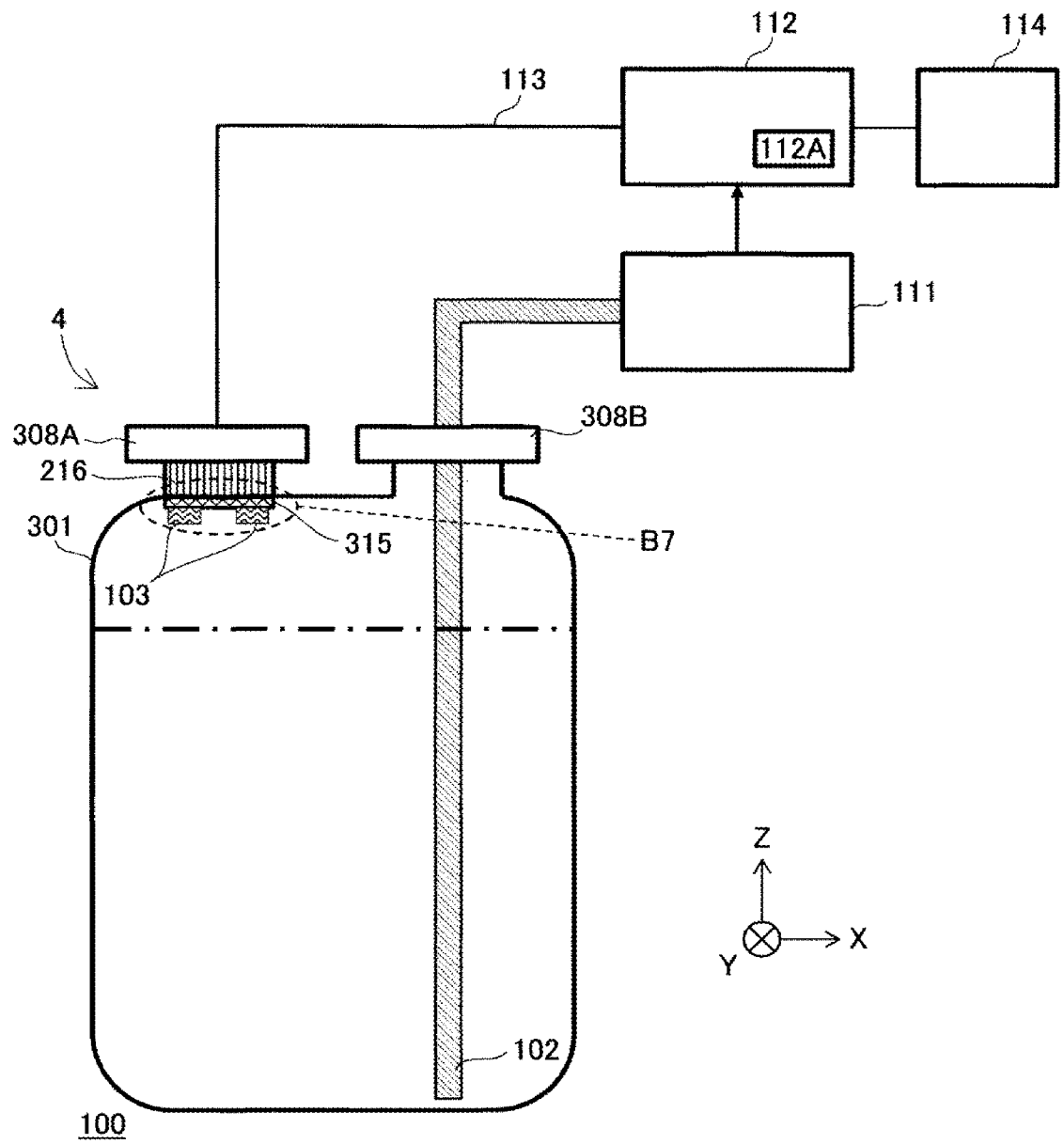

[Fig. 7B]
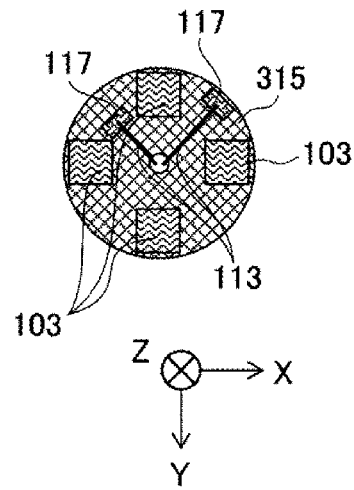
[Fig. 7C]
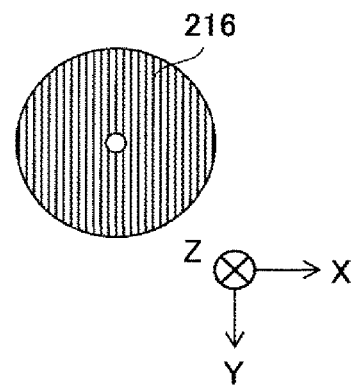
[Fig. 7D]
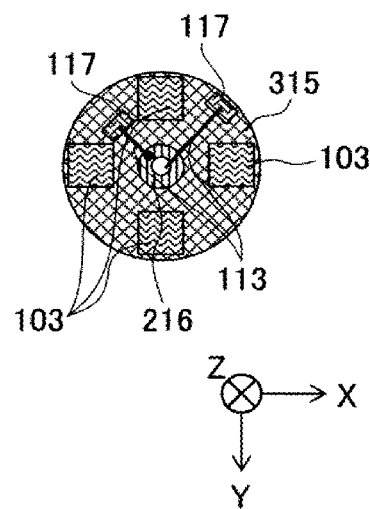

[Fig. 7E]
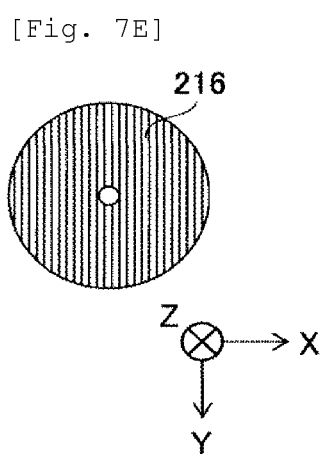

[Fig. 8A]
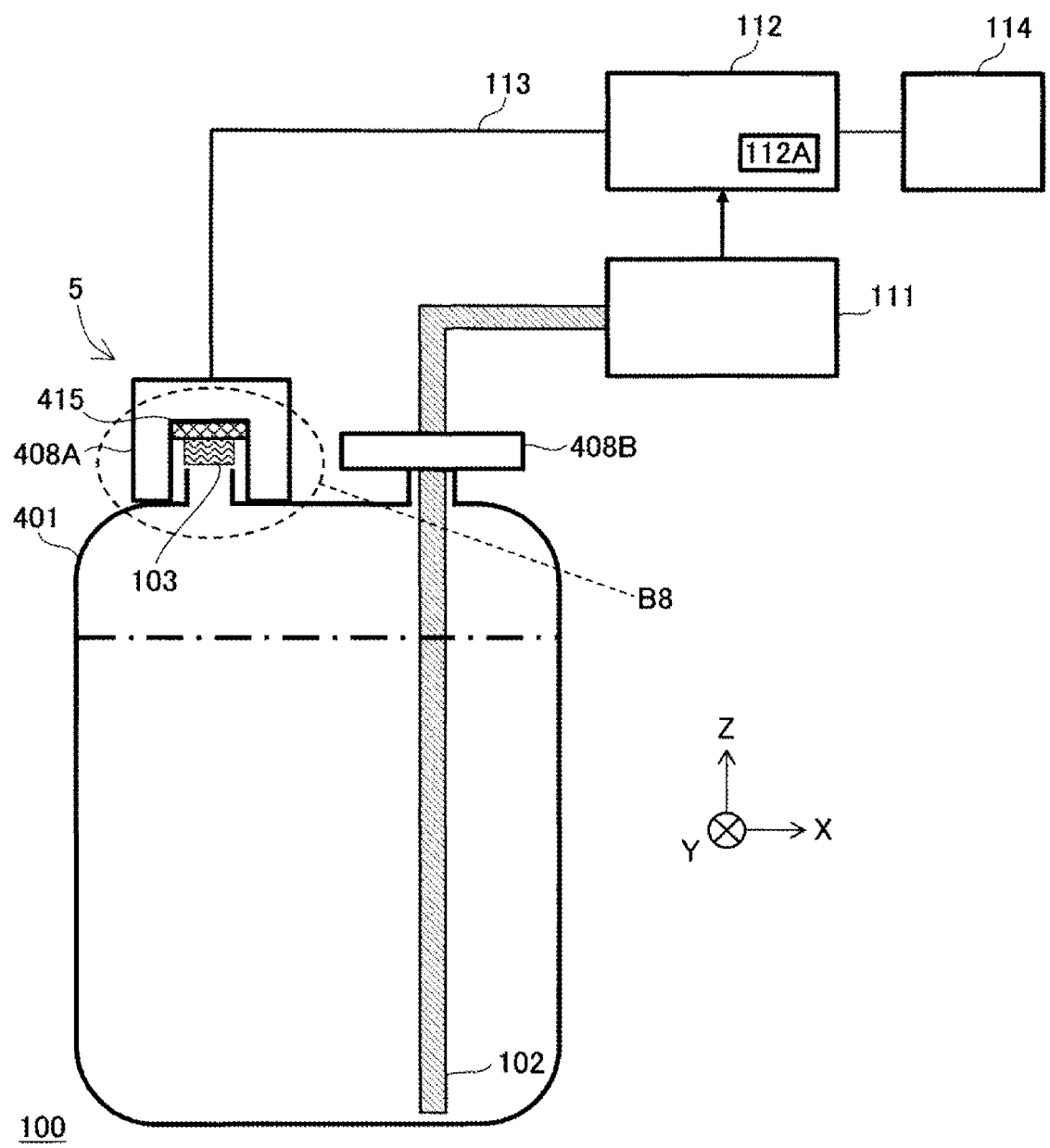

[Fig. 8B]
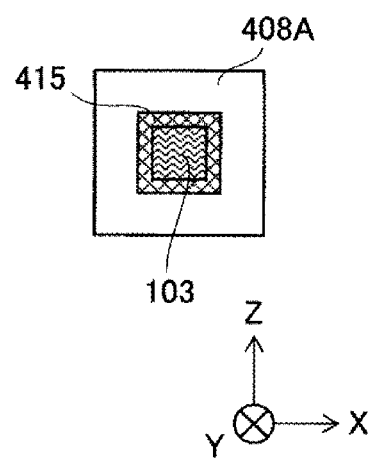

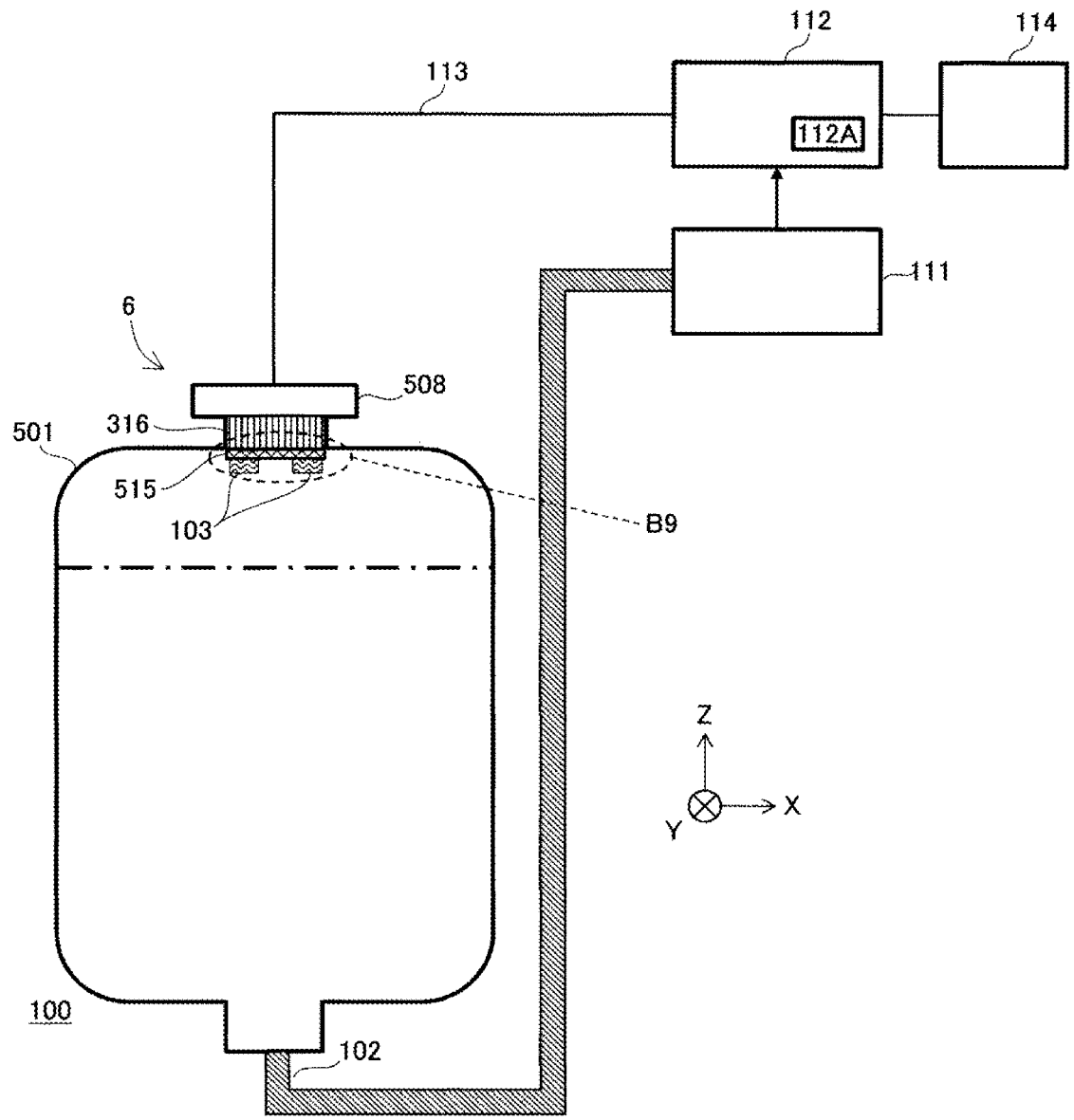
[Fig. 9A]

[Fig. 9B]
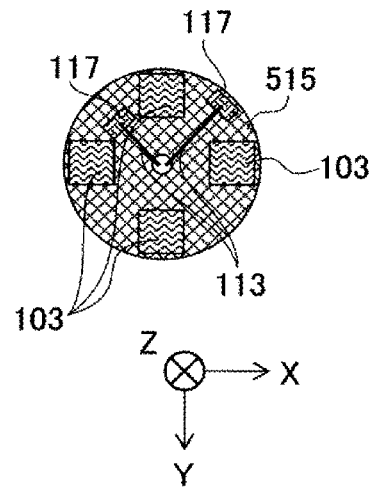
[Fig. 9C]
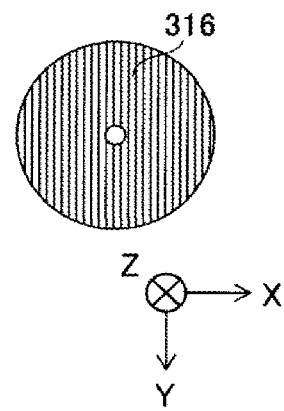
[Fig. 9D]
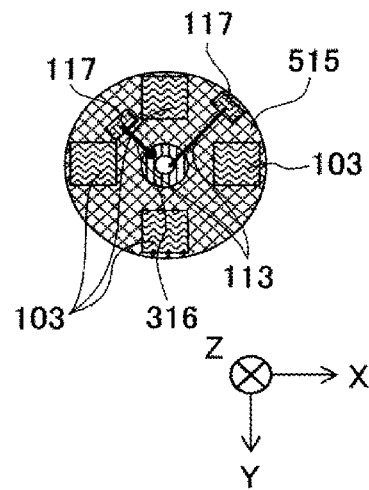

[Fig. 9E]
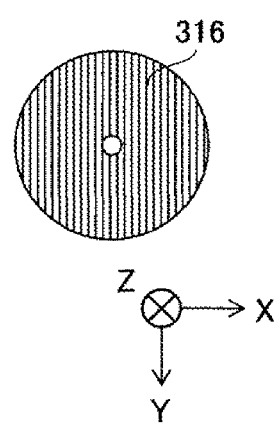

[Fig. 10]
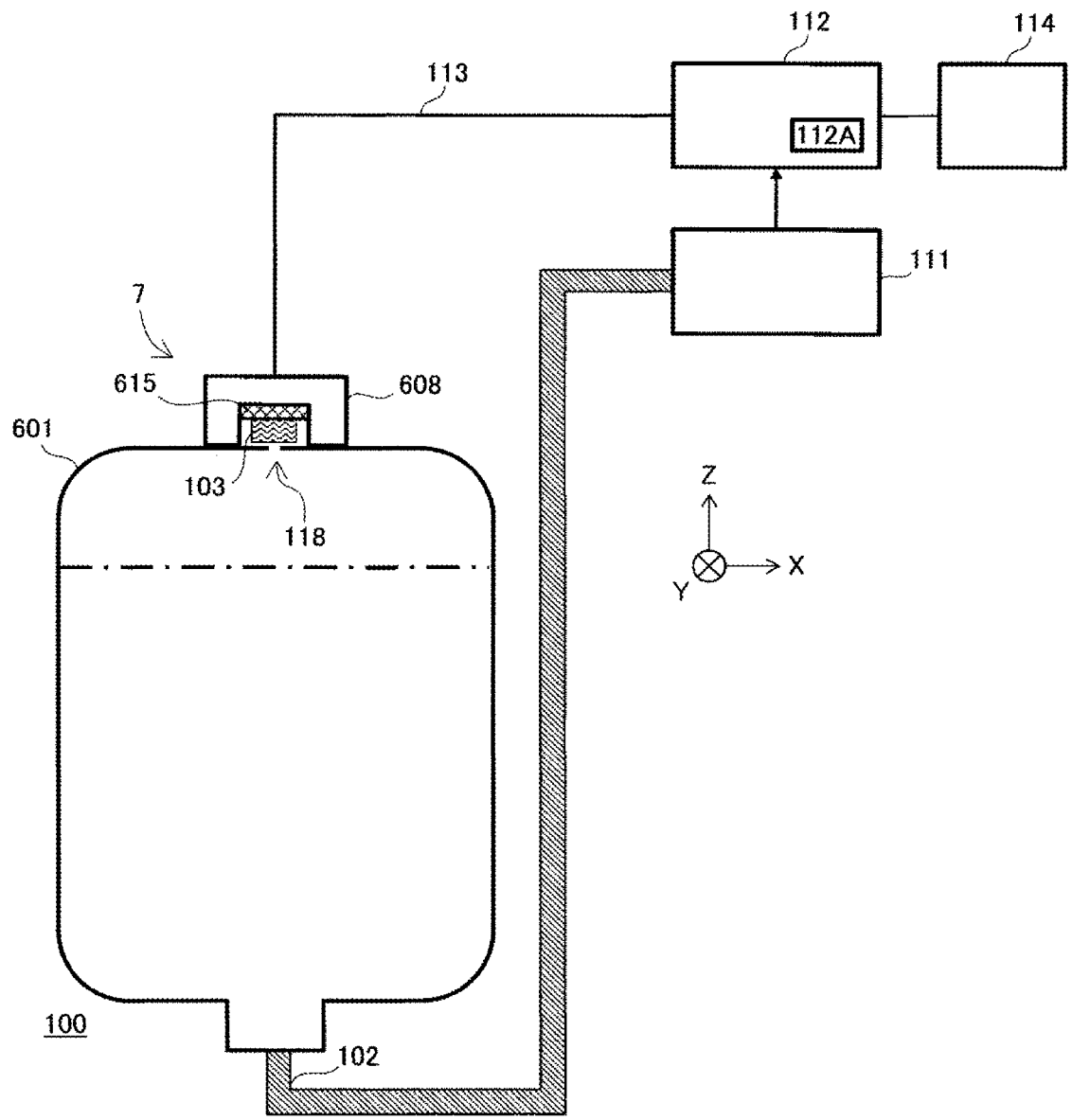

[Fig. 11]
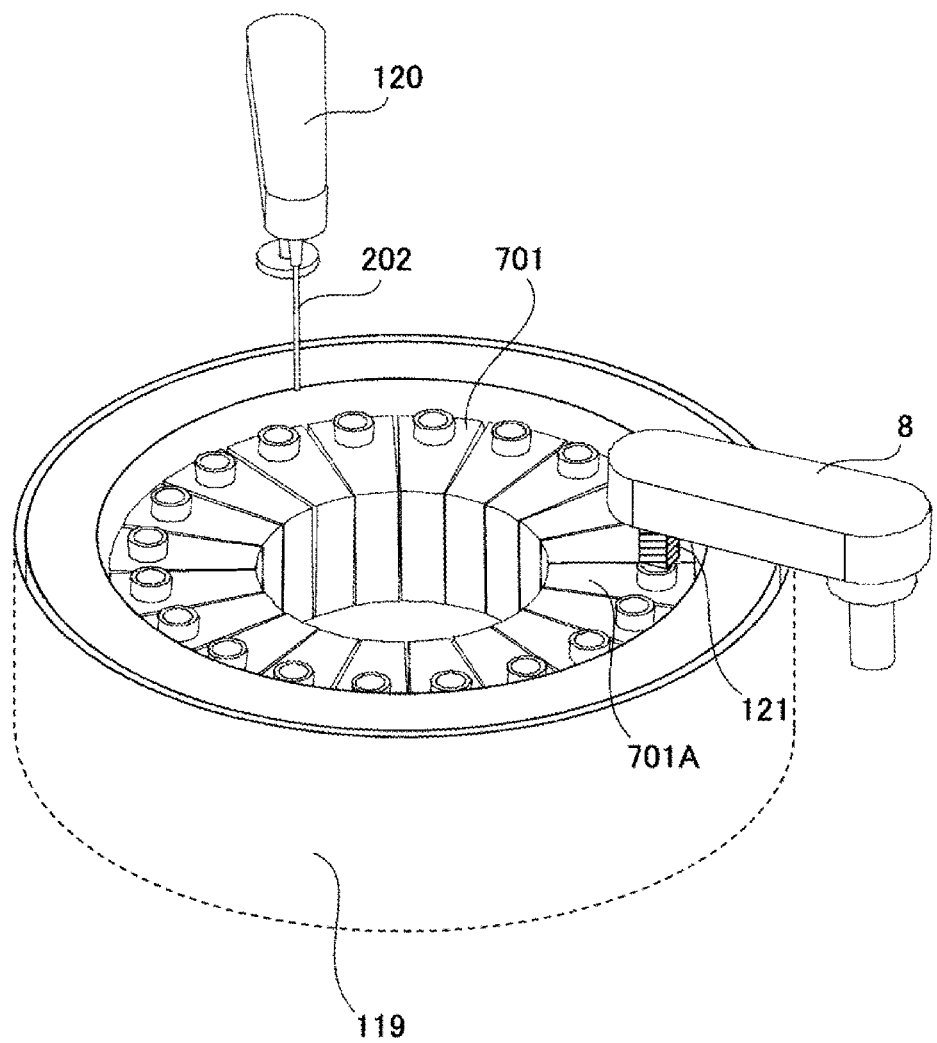

[Fig. 12A]
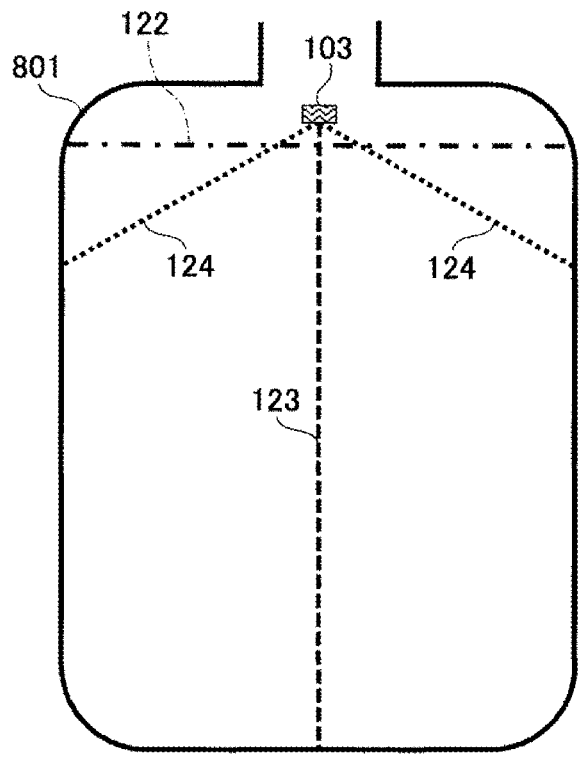
[Fig. 12B]
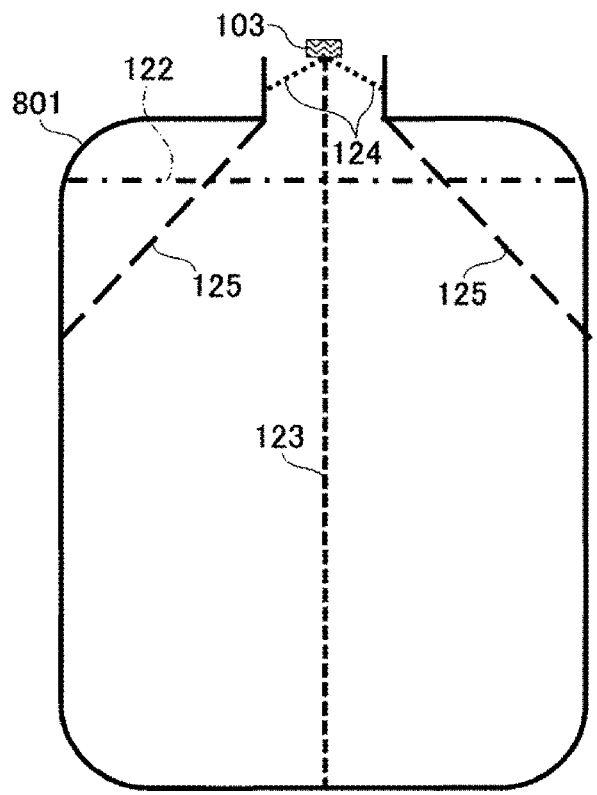

[Fig. 13A]
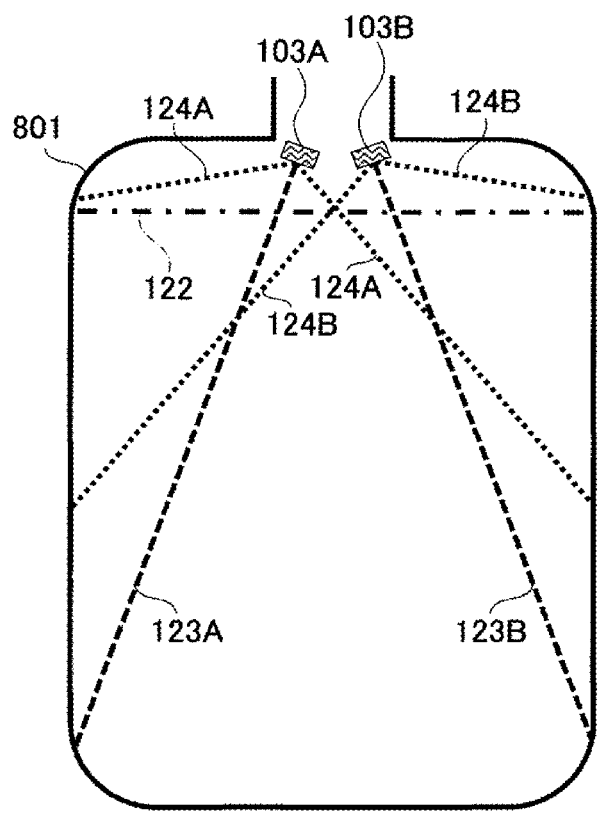

[Fig. 13B]
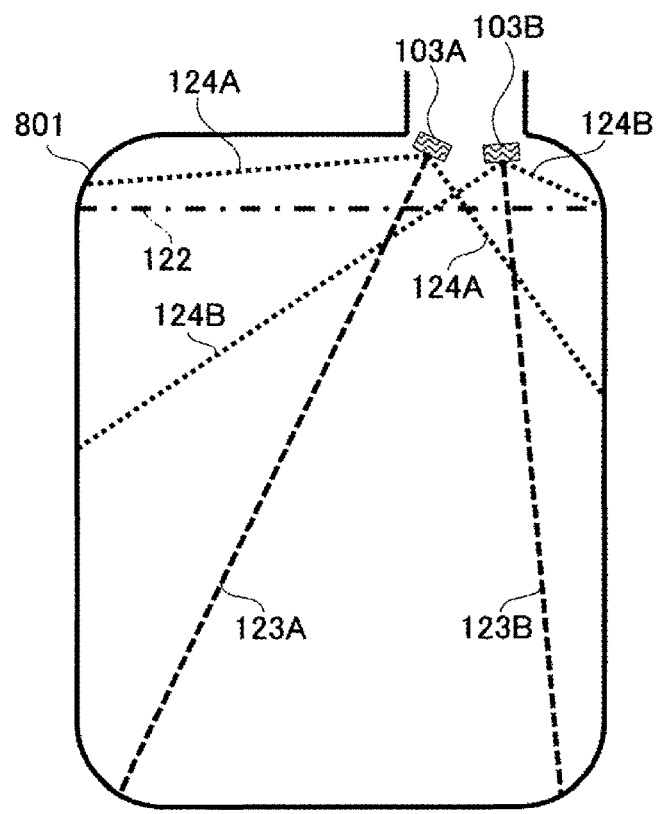
[Fig. 14A]
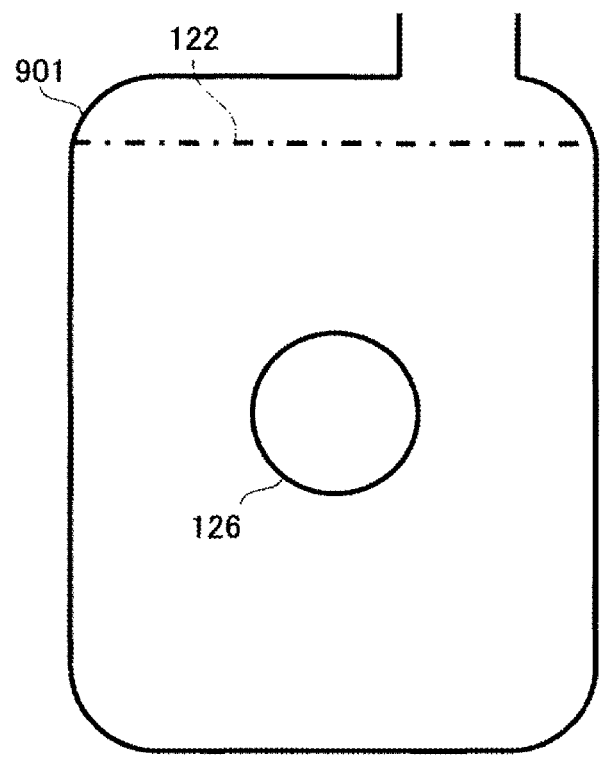

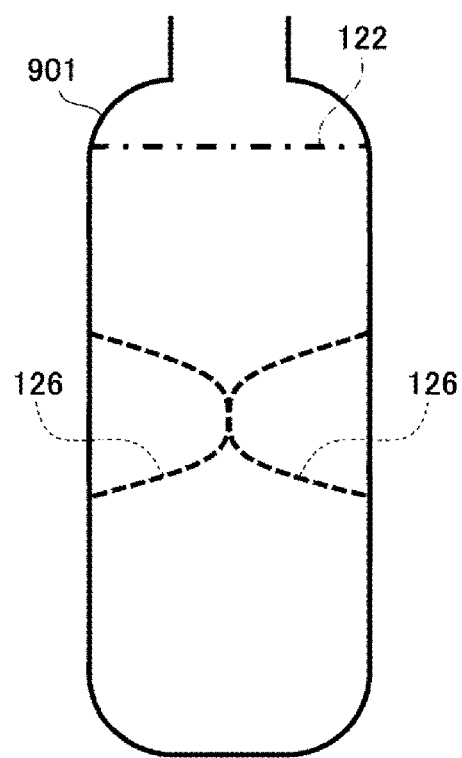
[Fig. 14B]

[Fig. 14C]
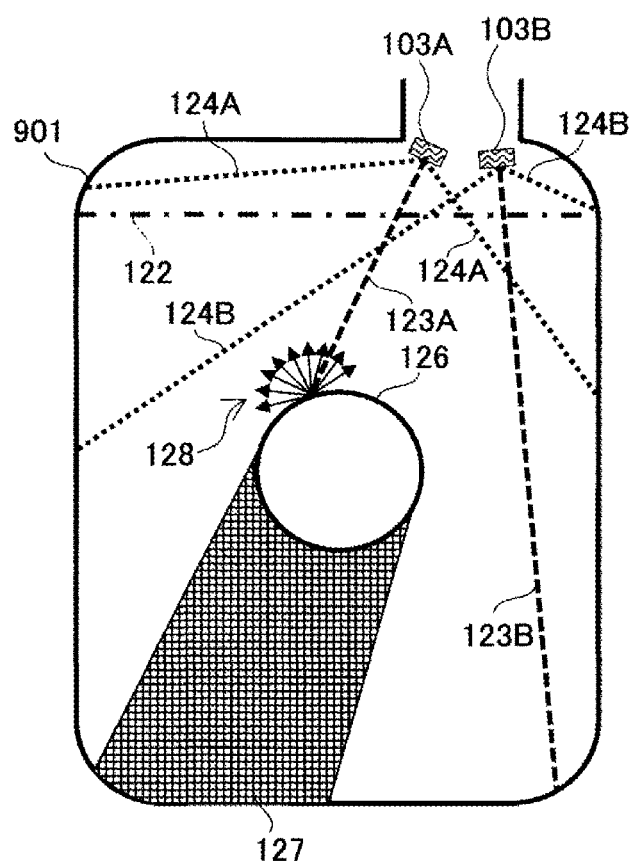

[Fig. 14D]
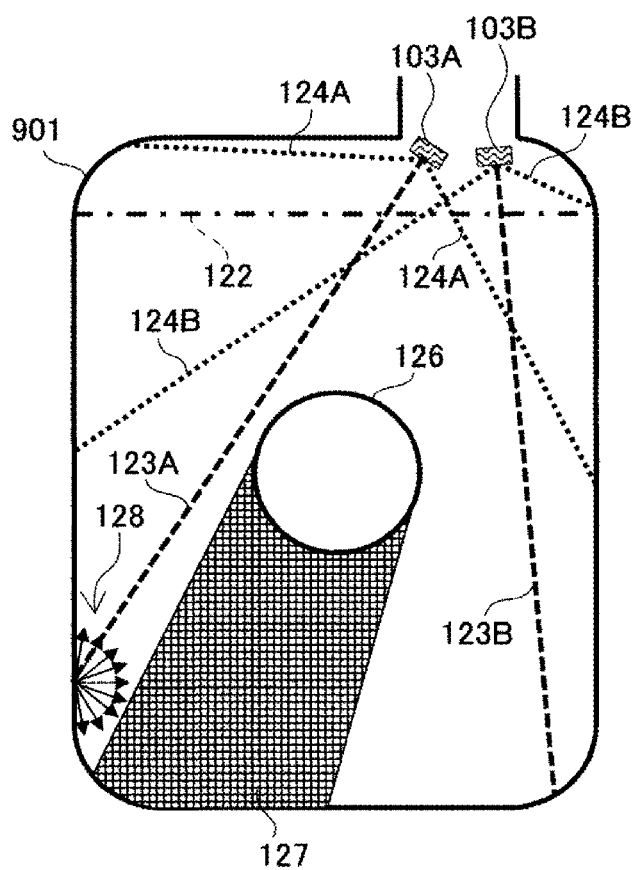

AUTOMATIC ANALYSIS APPARATUS

TECHNICAL FIELD

The present invention relates to an automatic analysis apparatus.

BACKGROUND ART

An automatic analysis apparatus is an apparatus that performs analysis operation by adding a reagent to a specimen (hereinafter referred to as a "sample") to be analyzed and derives an analysis result. Not only a reaction reagent that causes the reaction with the specimen, but also a diluent, a detergent, a buffer and a surfactant that activates an interface between an analysis target and the reaction reagent are broadly defined reagents.

Usually, a reagent is provided to a user in a state of being contained in a reagent vessel. The user places the provided reagent vessel in or near the automatic analysis apparatus and attaches a suction nozzle to a mouth of the reagent vessel. The automatic analysis apparatus sucks a reagent from the reagent vessel through the suction nozzle, adds the reagent to the sample, and measures a concentration of a substance to be measured contained in the sample.

When the reagent in the reagent vessel runs out, the user removes the suction nozzle from the reagent vessel and washes or cleans the suction nozzle as necessary. Thereafter, the user replaces a new reagent vessel filled with the reagent with an empty reagent vessel, attaches the suction nozzle to a mouth of the new regent vessel, and resumes the analysis operation.

However, in a replacement operation of the reagent vessel, various bacteria may be mixed and proliferate in the reagent. In addition, various bacteria may be mixed and proliferate in the reagent through the suction nozzle. When the various bacteria proliferate, properties of the reagent may change, and a reagent storage period may be limited. PTL 1 discloses a sterilization vessel capable of sterilizing microorganisms contained in a liquid by irradiating a liquid in a vessel with ultraviolet rays.

CITATION LIST

Patent Literature

PTL 1: JP-A-2013-75257

SUMMARY OF INVENTION

Technical Problem

When irradiating a reagent with ultraviolet rays, since each reagent has a different wavelength at which changes such as decomposition are likely to occur, it is necessary to select a wavelength of the ultraviolet rays at which a sterilizing effect can be acquired and at which the reagent is unlikely to change.

When an ultraviolet ray source is integrated with a vessel as in the sterilization vessel described in PTL 1, it is necessary to transfer the reagent from the reagent vessel to the sterilization vessel. There is a risk that the new reagent may be contaminated with a residual reagent due to the transfer operation, and there is a risk that the reagent during the transfer operation comes into contact with air and various bacteria may be mixed, and thus properties of the reagent may be changed. Therefore, it is considered that a configuration that can be attached to and removed from the reagent vessel is preferable as the configuration of the ultraviolet ray source.

In addition, when the suction nozzle attached to the reagent vessel is adjacent to the ultraviolet ray source or a peripheral member thereof, the ultraviolet ray source may be a heat source, so that the reagent in the suction nozzle may be heated. Here, the peripheral member refers to a member that is a part of or integral with a configuration of the ultraviolet ray source including an electrode or a substrate that supplies electric power to the ultraviolet ray source, a heat release portion, and a housing such as glass. There is no particular problem when a sterilization target is water as in the sterilization vessel described in PTL 1. However, when the sterilization target is a reagent, an operating temperature range of the reagent is determined for each reagent, and when a reagent temperature is out of the operating range due to heating, properties of the reagent change, and a reagent storage period may be limited.

An object of the invention is to provide an automatic analysis apparatus including a reagent sterilizing mechanism that does not change properties of a reagent.

Solution to Problem

The present application includes a plurality of solutions for solving the above problems, and an example thereof is an automatic analysis apparatus, including: a reagent vessel which holds a reagent; a suction nozzle which sucks the reagent held in the reagent vessel; an analysis unit which executes an analysis operation by adding a reagent sucked from the reagent vessel to a specimen via the suction nozzle; a sterilizing mechanism having an ultraviolet ray source which sterilizes a reagent by ultraviolet irradiation, and an electrode or a substrate as a power supply unit which supplies electric power to the ultraviolet ray source; and a first heat insulation structure which is arranged between the sterilizing mechanism and a reagent within the suction nozzle; and a second heat insulation structure which is arranged between the sterilizing mechanism and a reagent within the reagent vessel. The first heat insulation structure is a heat insulation portion that is arranged between the sterilizing mechanism and reagent in the suction nozzle to insulate the sterilizing mechanism from the reagent in the suction nozzle, or an isolation portion that is provided to isolate between the sterilizing mechanism and the reagent in the suction nozzle for heat insulation, and the second heat insulation structure is a heat insulation portion that is arranged between the sterilizing mechanism and reagent in the reagent vessel to insulate the sterilizing mechanism from the reagent in the reagent vessel, or an isolation portion that is provided to isolate between the sterilizing mechanism and the reagent in the reagent vessel for heat insulation.

Advantageous Effect

According to the invention, an automatic analysis apparatus including a reagent sterilizing mechanism that does not change properties of a reagent can be provided.

Other configurations and effects will become apparent from the following description of the embodiments.

BRIEF DESCRIPTION OF DRAWINGS

FIG. 1 is a diagram showing a sterilizing effect spectrum illustrating a wavelength dependence of the sterilizing effect of light according to a first embodiment.

FIG. 2 is a diagram showing an exemplified absorption spectrum of a reagent according to the first embodiment.

FIG. 3 is a diagram showing a spectrum obtained by dividing the sterilizing effect spectrum according to the first embodiment by an absorbance spectrum of the reagent.

FIG. 4A is a diagram schematically showing a configuration of an automatic analysis apparatus according to the first embodiment.

FIG. 4B is a ZX plane cross-sectional view taken along a line B4 of FIG. 4D.

FIG. 4C is a ZX plane cross-sectional view taken along a line C4 of FIG. 4D.

FIG. 4D is an enlarged longitudinal sectional view of a mouth peripheral portion D4 of a reagent vessel provided with a sterilizing mechanism.

FIG. 5A is a diagram schematically showing a configuration of an automatic analysis apparatus according to a second embodiment.

FIG. 5B is a ZX plane cross-sectional view taken along a line B5 of FIG. 5D.

FIG. 5C is a ZX plane cross-sectional view taken along a line C5 of FIG. 5D.

FIG. 5D is an enlarged longitudinal sectional view of a mouth peripheral portion D5 of a reagent vessel provided with a sterilizing mechanism.

FIG. 6A is a diagram schematically showing a configuration of an automatic analysis apparatus according to a third embodiment.

FIG. 6B is an enlarged ZX plane cross-sectional view of a mouth peripheral portion B6 of a reagent vessel provided with a sterilizing mechanism in FIG. 6A.

FIG. 7A is a diagram schematically showing a configuration of an automatic analysis apparatus according to a fourth embodiment.

FIG. 7B is an enlarged ZX plane cross-sectional view of a mouth peripheral portion B7 of a reagent vessel provided with a sterilizing mechanism in FIG. 7A.

FIG. 7C is an enlarged ZX plane cross-sectional view of the mouth peripheral portion B7 of the reagent vessel provided with the sterilizing mechanism in FIG. 7A.

FIG. 7D is an enlarged ZX plane cross-sectional view of the mouth peripheral portion B7 of the reagent vessel provided with the sterilizing mechanism in FIG. 7A.

FIG. 7E is an enlarged ZX plane cross-sectional view of the mouth peripheral portion B7 of the reagent vessel provided with the sterilizing mechanism in FIG. 7A.

FIG. 8A is a diagram schematically showing a configuration of an automatic analysis apparatus according to a fifth embodiment.

FIG. 8B is an enlarged ZX plane cross-sectional view of a mouth peripheral portion B8 of a reagent vessel provided with a sterilizing mechanism in FIG. 8A.

FIG. 9A is a diagram schematically showing a configuration of an automatic analysis apparatus according to a sixth embodiment.

FIG. 9B is an enlarged ZX plane cross-sectional view of a mouth peripheral portion B9 of a reagent vessel provided with a sterilizing mechanism in FIG. 9A.

FIG. 9C is an enlarged ZX plane cross-sectional view of the mouth peripheral portion B9 of the reagent vessel provided with the sterilizing mechanism in FIG. 9A.

FIG. 9D is an enlarged ZX plane cross-sectional view of the mouth peripheral portion B9 of the reagent vessel provided with the sterilizing mechanism in FIG. 9A.

FIG. 9E is an enlarged ZX plane cross-sectional view of the mouth peripheral portion B9 of the reagent vessel provided with the sterilizing mechanism in FIG. 9A.

FIG. 10 is a diagram schematically showing a configuration of an automatic analysis apparatus according to a seventh embodiment.

FIG. 11 is a diagram schematically showing a configuration around a reagent disk selectively excerpting from a configuration of an automatic analysis apparatus according to an eighth embodiment.

FIG. 12A is a longitudinal sectional view showing an exemplified positional relationship between an ultraviolet LED and a reagent vessel according to a ninth embodiment.

FIG. 12B is a longitudinal sectional view showing an exemplified positional relationship between the ultraviolet LED and the reagent vessel according to the ninth embodiment.

FIG. 13A is a longitudinal sectional view showing another exemplified positional relationship between the ultraviolet LED and the reagent vessel according to the ninth embodiment.

FIG. 13B is a longitudinal sectional view showing another exemplified positional relationship between the ultraviolet LED and the reagent vessel according to the ninth embodiment.

FIG. 14A is a longitudinal sectional view showing still another exemplified positional relationship between the ultraviolet LED and the reagent vessel according to the ninth embodiment.

FIG. 14B is a longitudinal sectional view showing still another exemplified positional relationship between the ultraviolet LED and the reagent vessel according to the ninth embodiment.

FIG. 14C is a longitudinal sectional view showing still another exemplified positional relationship between the ultraviolet LED and the reagent vessel according to the ninth embodiment.

FIG. 14D is a longitudinal sectional view showing still another exemplified positional relationship between the ultraviolet LED and the reagent vessel according to the ninth embodiment.

DESCRIPTION OF EMBODIMENTS

Embodiments of the invention will be described below with reference to the drawings. The embodiments of the invention are not limited to the embodiments to be described below, and various modifications can be made within the scope of the technical idea thereof.

As used herein, an expression of "sterilizing" or "killing microorganisms" is also used in the meaning of "detoxifying microorganisms" or "inactivating microorganisms" in addition to "killing microorganisms". These expressions are also used in the meaning of reducing bacteria and microorganisms, in addition to the meaning of killing bacteria and microorganisms.

Hereinafter, embodiments of the invention will be described in detail with reference to the drawings.

(1) First Embodiment

A first embodiment of the invention will be described with reference to FIGS. 1 to 3 and FIGS. 4A to 4D.

(1-1) Wavelength Selection

A wavelength of ultraviolet rays used in the present embodiment will be described.

FIG. 1 is a diagram showing a sterilizing effect spectrum illustrating a wavelength dependence of a sterilizing effect of light, in which a horizontal axis represents a light wavelength and a vertical axis represents a relative value of the sterilizing effect.

It is desired that the wavelength of the ultraviolet rays for sterilizing a reagent has a large sterilizing effect and unlikely to cause a change such as decomposition of the reagent.

FIG. 1 shows, as an example, a sterilizing effect of light with respect to a certain microorganism. As shown in FIG. 1, a sterilizing effect by light is usually correlated with a light absorption spectrum of DNA of a microorganism to be sterilized and has a wavelength dependence. The sterilizing effect is greatest near a wavelength of 260 nm where absorption is large, and the further away from this wavelength, the lower the relative sterilizing effect. When the wavelength of the ultraviolet rays is 200 nm to 300 nm, the ultraviolet rays have a relatively high sterilizing effect on the microorganisms.

Even if the wavelength is shorter than 200 nm or longer than 300 nm, the sterilizing effect is not necessarily zero. For example, at a wavelength of 340 nm, although the sterilizing effect is about $1/1000$ of a peak near the wavelength of 260 nm, it has the sterilizing effect, and in some cases, practical sterilization can be performed by increasing an output of the ultraviolet rays and lengthening irradiation time. Therefore, from the viewpoint of the sterilizing effect, ultraviolet rays having a wavelength of 180 nm to 350 nm are selected.

Meanwhile, likeliness of changes such as decomposition of the reagent due to ultraviolet irradiation to the reagent correlates with the light absorption spectrum of the reagent. When the absorption of the reagent is large with respect to the ultraviolet rays to be irradiated, changes such as decomposition due to the ultraviolet irradiation are likely to occur.

FIG. 2 is a diagram showing an example of an absorption spectrum of the reagent, in which a horizontal axis represents a wavelength and a vertical axis represents absorbance.

For example, when a reagent having an absorption spectrum as shown in FIG. 2 is to be sterilized, since absorption is large on a shorter wavelength side than a wavelength of 240 nm, it is desirable to select ultraviolet rays having a wavelength longer than 240 nm. When selecting a wavelength that maximizes a ratio of a rate of ultraviolet ray sterilization to a rate of change such as decomposition of the reagent, a standard can be obtained from a wavelength dependence of a ratio of the ultraviolet ray sterilizing effect to the ultraviolet ray absorption of the reagent.

FIG. 3 is a diagram showing a spectrum obtained by dividing the sterilizing effect spectrum of FIG. 1 by the absorbance spectrum of FIG. 2.

As shown in FIG. 3, it can be seen that a ratio of the ultraviolet ray sterilizing effect to the absorption of the reagent is large near a wavelength of 300 nm, and small at wavelengths of 240 nm or less, 340 nm or more, and near 280 nm. Therefore, by using the ultraviolet rays with a wavelength of 300 nm, a ratio of a rate of ultraviolet ray sterilization to a rate of change such as decomposition of the reagent may be maximized, and when the ultraviolet rays having the wavelength of 240 nm or less or near 280 nm are used, the change such as decomposition of the reagent may proceed relatively fast.

For example, since an ultraviolet ray lamp has fixed wavelengths of 185 nm and 254 nm, which are mercury bright lines, it is considered that the ultraviolet ray lamp is not suitable for a large number of reagent sterilization ultraviolet ray sources. On the other hand, an ultraviolet LED capable of changing an emission wavelength by controlling a composition of a semiconductor crystal is considered to be suitable for the reagent sterilization ultraviolet ray source.

In addition, since the ultraviolet LED has a variation of about ±5 nm in a central emission wavelength and has a spectrum half width of about 15 nm, it is desirable to select the central emission wavelength of the ultraviolet LED serving as an ultraviolet ray source in consideration of these factors. Since the efficiency of reagent decomposition due to ultraviolet ray absorption of the reagent may differ greatly depending on the wavelength, the ratio of the rate of ultraviolet ray sterilization to the rate of change such as decomposition of the reagent may be obtained from an experiment using the ultraviolet LED. The rate of change such as decomposition of the reagent or the like can be evaluated by chromatographic or mass spectrometric analysis of a temporal change in a concentration of reagent components due to ultraviolet irradiation. When a by-product generated by a change such as decomposition has an absorbance spectrum different from that of the original reagent, the rate of change can be evaluated from a temporal change of the absorption spectrum.

(1-1.1) Effect of Wavelength Selection

By using an ultraviolet ray source having a large wavelength of the ratio of the ultraviolet ray sterilizing effect to the ultraviolet ray absorption of the reagent or the ratio of the rate of the ultraviolet ray sterilization to the rate of change such as decomposition of the reagent for the reagent sterilization, the reagent can be sterilized while preventing the change such as decomposition of the reagent due to the ultraviolet irradiation.

(1-2) Apparatus Configuration

FIG. 4A is a diagram schematically showing a configuration of an automatic analysis apparatus according to the present embodiment. Further, FIG. 4D is an enlarged longitudinal sectional view of a mouth peripheral portion D4 of the reagent vessel provided with a sterilizing mechanism. FIG. 4B is a ZX plane cross-sectional view taken along line B4 of FIG. 4D, and FIG. 4C is a ZX plane cross-sectional view taken along line C4 of FIG. 4D.

In the present embodiment, in an automatic analysis apparatus 100, a door of a reagent vessel storage chamber of an apparatus main body is opened, a reagent vessel 101 provided by a vendor is installed in the storage chamber, a suction nozzle 102 and a sterilizing mechanism 1 are attached, and the door is closed so that the apparatus can be used. At this time, a user removes a lid attached at the time of distribution from a mouth of the reagent vessel 101 (an opening for accessing the inside of the reagent vessel 101. Hereinafter, simply referred to as a mouth), and inserts the suction nozzle 102 and the sterilizing mechanism 1 into the exposed mouth. FIG. 4A illustrates an example in which a shape of the mouth of the reagent vessel 101 is a round shape (a cylindrical shape whose central axis is directed in an up-down direction).

The sterilizing mechanism 1 includes a cylindrical outer electrode 104 and a cylindrical inner electrode 105 to which an ultraviolet LED 103 as an ultraviolet ray source is attached, and a fixing portion 108. The ultraviolet LED 103 is disposed in the reagent vessel 101. An electrical insulation portion 106 is provided between the outer electrode 104 and the inner electrode 105. For example, a cathode of the ultraviolet LED 103 is connected to the outer electrode 104, an anode of the ultraviolet LED 103 is connected to the inner electrode 105, and the ultraviolet LED 103 emits ultraviolet rays by supplying electric power through wirings 113 connected to the electrodes. The suction nozzle 102 penetrates the inner electrode 105 without touching the inner electrode 105, and a heat insulation portion 107 as a heat insulation structure is provided between the inner electrode 105 and the suction nozzle 102. The ultraviolet LED 103 does not touch the suction nozzle 102.

The suction nozzle 102 and the outer electrode 104 are fixed to the fixing portion 108. The inner electrode 105 may be fixed to the fixing portion 108, or may be fixed to the outer electrode via the ultraviolet LED 103 without being fixed to the fixing portion 108. The fixing portion 108 does not electrically connect the outer electrode 104 and the inner electrode 105. The fixing portion 108 insulates the outer electrode 104 and the inner electrode 105 from the suction nozzle 102.

The fixing portion 108 may be formed of a metal having high electric conductivity. By electrically connecting the fixing portion 108 to one of the outer electrode 104 and the inner electrode 105, and electrically insulating the fixing portion 108 from the other, the fixing portion 108 may be substituted for a part of the wirings 113 for power supply. Further, the fixing portion 108 may function as a heat release portion and release heat generated when the ultraviolet rays are emitted from the ultraviolet LED 103 via the fixed electrode.

As shown in FIGS. 4B to 4D, in the present embodiment, the fixing portion 108 is formed of a metal having high thermal conductivity and electric conductivity, and is substituted for apart of the heat release portion and the wirings 113. When both the outer electrode 104 and the inner electrode 105 are fixed to the fixing portion 108, an insulation portion is provided at a portion in contact with one of the electrodes. Here, the outer electrode 104 and the fixing portion 108 are electrically connected, and an insulation portion 109 is provided between the inner electrode 105 and the fixing portion 108 for insulation. It is desirable that the insulation portion 109 has high thermal conductivity. When the inner electrode 105 is not fixed to the fixing portion 108, the insulation portion 109 is unnecessary. The power is supplied to the ultraviolet LED 103 through the wirings 113 connected to the outer electrode and the inner electrode, whereas the fixing portion 108 is substituted for a part of the wirings 113. Further, by providing a heat insulation portion 110 at a portion where the suction nozzle 102 and the fixing portion 108 are in contact, the suction nozzle 102 and the fixing portion 108 having the function of a heat release portion are insulated.

In the present embodiment, most of the heat generated from the ultraviolet LED 103 is released into the air via the outer electrode 104, the inner electrode 105, and the fixing portion 108. Since the heat release performance increases as a volume and a surface area of the outer electrode 104, the inner electrode 105, and the fixing portion 108 increase, it is desirable that the outer electrode 104 and inner electrode 105 are large in a range that can pass through the mouth of the reagent vessel 101, and that the fixing portion 108 having the function of the heat release portion is large in a range that can enter the reagent vessel storage chamber. Further, a heat sink structure may be adopted for the fixing portion 108.

By attaching the fixing portion 108 to the mouth of the reagent vessel 101, the reagent vessel 101 is brought into a sealed state again. However, when the suction nozzle 102 sucks the reagent, a gap in which air enters the reagent vessel 101 is present. The fixing portion 108 is detachable from the mouth of the reagent vessel 101.

The ultraviolet LED 103 is fixed at a position without touching the reagent even when the fixing portion 108 is fixed to the reagent vessel 101 immediately after replacement, that is, even when a liquid level of the reagent in the reagent vessel 101 is at a highest position. Therefore, the outer electrode 104 and the inner electrode 105 supplying electric power to the ultraviolet LED 103 are also fixed at positions without touching the reagent. Therefore, the ultraviolet LED 103 emits the ultraviolet rays toward an inner wall surface of the reagent vessel 101 and the liquid level of the reagent.

The ultraviolet LED 103, the outer electrode 104, and the inner electrode 105 are not necessarily waterproof. However, when the reagent is contained in the reagent vessel 101 and vibration is applied to the reagent vessel 101 in a state in which the sterilizing mechanism 1 enters the reagent vessel 101, the reagent may touch the ultraviolet LED 103, the outer electrode 104, and the inner electrode 105. Therefore, the ultraviolet LED 103, the outer electrode 104, and the inner electrode 105 may be waterproof. Methods of waterproof include a method of covering the whole with a quartz glass housing with high ultraviolet ray transmittance, a method of coating with a fluororesin with high ultraviolet ray transmittance, and a method of coating the ultraviolet LED 103 with rubber or resin having low ultraviolet ray transmittance, except for an ultraviolet irradiation unit.

The number and arrangement of the ultraviolet LEDs and an inclination angle with respect to a horizontal plane are determined in consideration of a shape and a size of the reagent vessel, a positional relationship between the ultraviolet LED and the suction nozzle, and an entry route of the microorganisms.

The reagent sucked from the suction nozzle 102 is sent to an analysis unit 111 and used for analysis. A known part of the configuration and processing functions of the analysis unit 111 is omitted. A function specific to the present embodiment has a function of notifying a control unit 112 of a remaining amount of the reagent.

The wirings 113 are connected to the outer electrode 104 via the fixing portion 108, and is also connected to the inner electrode 105. The control unit 112 supplies power to the ultraviolet LED 103 via the wirings 113 to control an irradiation dose. Switching between irradiation and extinguishing of the ultraviolet LED 103 is controlled by the presence or absence of the power supply, and the power of the ultraviolet rays is controlled by an amount of electric power to be supplied.

The wirings 113 include not only a wiring for power supply to and control of the ultraviolet LED 103, but also a signal line of a temperature sensor such as a thermistor or a signal line that notifies the control unit 112 of the state of the ultraviolet LED 103. In addition, the automatic analysis apparatus 100 includes a display unit 114 that notifies the user that appropriate sterilization of the reagent is performed or that abnormality is detected. The user of the apparatus can know the state of the reagent or the sterilizing mechanism through a screen displayed on the display unit 114. The display unit 114 may display an interface used for an operation and control of the automatic analysis apparatus 100, an analysis result, and an apparatus state. Notification contents include, for example, whether appropriate sterilization is executed, and abnormality detection.

The control unit 112 controls any one or a combination of a current, a voltage, and an energization time supplied to the ultraviolet LED 103 to an appropriate value based on the remaining amount of the reagent notified from the analysis unit 111. Here, the control unit 112 controls any one or a combination of the current, the voltage, and the energization time such that the irradiation dose of the ultraviolet rays decreases as the remaining amount of the reagent decreases.

The larger a current value and a voltage value, the larger an ultraviolet irradiation dose applied per unit time. The longer the energization time, the larger the ultraviolet irradiation dose. The irradiation dose may be controlled by pulse driving the ultraviolet LED 103 and varying a pulse width corresponding to the energization time.

The irradiation dose of the ultraviolet rays generated in the current, the voltage, and the energization time is controlled to be not less than an ultraviolet irradiation dose per unit liquid amount necessary for sterilization of the reagent and not more than an ultraviolet irradiation dose corresponding to an upper limit of an allowable range of the change in reagent properties. The ultraviolet irradiation dose per unit liquid amount necessary for sterilization of the reagent differs depending on types of bacteria to be sterilized and wavelengths of the ultraviolet rays to be used, and thus is obtained in advance by actual measurement or calculation. The ultraviolet irradiation dose at which the change in the reagent properties falls within the allowable range also differs depending on a combination of reagent components, especially chemically bonded species of the reagent, and the wavelength of the ultraviolet rays to be used, and thus is obtained in advance by actual measurement or calculation. A storage unit 112A of the control unit 112 also stores a relationship (a table) between these relationships and the remaining amount of the reagent. Of course, the relationship between these relationships and the remaining amount of the reagent is also obtained in advance by actual measurement or calculation.

The analysis unit 111 calculates the remaining amount of the reagent in the reagent vessel 101 based on a value of the number of analysis (or the number of measurements). Since the amount of the reagent to be used in one analysis (or measurement) is known in advance, by multiplying the value by the number of analysis (or the number of measurements), it is possible to calculate a used amount after replacing the reagent vessel 101. Since the amount of the reagent filled in the new reagent vessel 101 is also known, the remaining amount can be obtained by subtracting the calculated used amount from the known liquid amount. The remaining amount of the reagent may be obtained using a liquid level detection mechanism. Since the liquid level detection mechanism is known, a detailed description thereof is omitted.

The control unit 112 controls any one or a combination of the current, the voltage, and the energization time supplied to the ultraviolet LED 103 to an appropriate value based on the reagent temperature in the suction nozzle 102. Here, the control unit 112 controls any one or a combination of the current, the voltage, and the energization time supplied to the ultraviolet LED 103 to an appropriate value such that the reagent temperature in the suction nozzle 102 does not exceed an upper limit of a use temperature determined by a specification of the reagent. Although the reagent in the suction nozzle 102, the ultraviolet LED 103, the outer electrode 104, the inner electrode 105, and the fixing portion 108 are insulated by the heat insulation portion 107 and the heat insulation portion 110, the reagent temperature in the suction nozzle 102 rises and saturates as the ultraviolet irradiation time elapses in a gradual manner as compared with the case without heat insulation. In particular, the temperature rise at a position close to the inner electrode 105 is large. Therefore, the reagent temperature in the suction nozzle 102 at the position close to the inner electrode 105 is measured using a temperature sensor such as a thermistor. Instead of directly measuring the reagent temperature, the reagent temperature may be indirectly measured by measuring the temperature of the suction nozzle 102 at a position close to the inner electrode 105. A measurement result of the temperature sensor is notified to the control unit 112 through the wiring.

Further, the control unit 112 controls any one or a combination of the current, the voltage, and the energization time supplied to the ultraviolet LED 103 to an appropriate value based on a bonding temperature of the ultraviolet LED 103. Here, the control unit 112 controls any one or a combination of the current, the voltage, and the energization time supplied to the ultraviolet LED 103 to an appropriate value such that the bonding temperature of the ultraviolet LED 103 does not exceed an upper limit of a bonding temperature determined by the specification of the ultraviolet LED 103. Since it is difficult to directly measure the bonding temperature of the ultraviolet LED 103, a temperature sensor such as a thermistor is disposed near the ultraviolet LED 103 to indirectly measure the temperature of a solder bonding unit, and the bonding temperature of the ultraviolet LED 103 is estimated by calculation. When a plurality of ultraviolet LEDs 103 are included, a plurality of temperature sensors may be provided on a one-to-one basis, or one temperature sensor may be provided as a representative. A measurement result of the temperature sensor is notified to the control unit 112 through the wiring.

The irradiation time and timing of the ultraviolet irradiation are determined based on an expiration date of the reagent after opening the reagent vessel and the ultraviolet irradiation dose necessary for sterilization of the reagent, the ultraviolet irradiation dose corresponding to the upper limit of the allowable range of the change in the reagent properties, and the timing of reagent suction. For example, the ultraviolet rays may be constantly emitted until the expiration date of the reagent after opening the reagent vessel, or alternatively, when the irradiation dose is no less than the ultraviolet irradiation dose necessary for the sterilization of the reagent and no more than the ultraviolet irradiation dose corresponding to the upper limit of the allowable range of the change in the reagent properties, the irradiation may be constantly performed. On the other hand, in the case of constant irradiation, when the irradiation dose is excessive with respect to the ultraviolet irradiation dose necessary for the sterilization of the reagent, and is no more than the ultraviolet irradiation dose corresponding to the upper limit of the allowable range of the change in the reagent properties, an intermittent operation may be performed within a range that is no less than the ultraviolet irradiation dose necessary for the sterilization of the reagent. Further, in the case where the irradiation dose of constant irradiation is excessive with respect to the ultraviolet irradiation dose necessary for the sterilization of the reagent, and is no less than the ultraviolet irradiation dose corresponding to the upper limit of the allowable range of the change in the reagent properties, the intermittent operation is performed such that the irradiation dose is no less than the ultraviolet irradiation dose necessary for the sterilization of the reagent, and is no more than the ultraviolet irradiation dose corresponding to the upper limit of the allowable range of the change in the reagent properties. When performing the intermittent operation, when the ultraviolet irradiation necessary for sterilization of the reagent is possible within a time interval of the suction nozzle 102 performing the reagent suction, efficient sterilization of the sucked reagent is possible by performing the ultraviolet irradiation necessary for sterilization of the reagent before the suction nozzle 102 starts the reagent suction and extinguishing the ultraviolet rays after starting the reagent suction or after completing the reagent suction.

In order to cope with the case where the reagent is irradiated with the ultraviolet rays while the automatic analysis apparatus is shut down, a part of the analysis unit 111 related to the ultraviolet irradiation and the control unit 112 can use a power supply for a reagent cooling box to which electric power is supplied even when the automatic analysis apparatus is shut down.

Since the ultraviolet rays having a sterilizing effect are harmful to human body, in order to prevent the user from being exposed to the ultraviolet rays, the automatic analysis apparatus may be provided with an interlock mechanism for extinguishing the ultraviolet LED 103 when the door of the reagent vessel storage chamber is opened.

The outer electrode 104 and the inner electrode 105 are preferably formed of a metal having high electric conductivity and high thermal conductivity, such as aluminum, copper, or an alloy containing the same. The insulation portion 106 is formed of resin, rubber, oxide, nitride, air, or the like having low electric conductivity. The heat insulation portion 107 is a space such as air or vacuum, or a material having low thermal conductivity such as resin or rubber. When the fixing portion 108 has a function of the heat release portion and allows electrical connection, it is desirable to form the fixing portion 108 with a metal having high electric conductivity and high thermal conductivity such as aluminum, copper, or an alloy containing the same. The insulation portion 109 is preferably an oxide or nitride having low electric conductivity and high thermal conductivity, and may be formed of resin or rubber. A material having a low thermal conductivity such as resin or rubber is used for the heat insulation portion 110.

In the present embodiment, the shape of the mouth of the reagent vessel 101 is a round shape, but may also be a shape other than the round shape. For example, in a case where the shape of the mouth is square, the electrode may have a cylindrical shape capable of passing through the mouth, or may have a square tube shape capable of passing through the mouth. In order to improve heat release performance, and to increase the volume and the surface area within a range capable of passing through the mouth, the outer electrode may be formed into a square tube shape with a square hole, and the inner electrode may be formed into a square tube shape with a round hole.

In the present embodiment, the suction nozzle 102 passes through the center of the electrode, but may also pass through a position other than the center.

(1-3) Effect of Present Embodiment

When the automatic analysis apparatus 100 according to the present embodiment configured as described above is used, neither the ultraviolet LED 103 which is an ultraviolet ray source, nor the peripheral members thereof, that is, the outer electrode 104, the inner electrode 105, and the fixing portion 108 which also functions as a heat release portion touch the suction nozzle 102, the heat insulation portion 107 is provided between the inner electrode 105 and the suction nozzle 102, and the heat insulation portion 110 is provided between the fixing portion 108 and the suction nozzle 102. Therefore, the effect of the heat generated by the ultraviolet LED 103 heating the reagent in the suction nozzle 102 can be prevented. As a result, it is possible to prevent a change in properties due to heating of the reagent in the nozzle, which is a problem when sterilizing the reagent with the ultraviolet rays.

All of the ultraviolet LED 103 and the peripheral members which are the outer electrode 104, the inner electrode 105, and the fixing portion 108 are not immersed in the reagent. Therefore, the reagent in the reagent vessel 101 is not directly heated. Therefore, the change in properties due to the heating of the reagent in the reagent vessel 101 can also be prevented.

The automatic analysis apparatus 100 according to the present embodiment appropriately controls the ultraviolet irradiation dose used to sterilize the reagent in accordance with the liquid amount of the reagent remaining in the reagent vessel 101. Specifically, with the decrease in the remaining amount of the reagent, the control unit 112 can reduce the ultraviolet irradiation dose to an appropriate amount.

In addition, by adopting the control method, proliferation of various bacteria in the reagent due to insufficient irradiation dose and the change in components of the reagent due to excessive irradiation can be prevented, which enables both sterilization of the reagent and maintenance of the reagent properties, and enables use of the reagent for a longer period of time.

Further, in the automatic analysis apparatus 100 according to the present embodiment, since the sterilizing mechanism 1 is detachably attached to the reagent vessel 101 provided by the vendor, a reagent transfer operation is not necessary at the time of replacing the reagent. In addition, there is no fear of mixing of the residual reagent or various bacteria as in the case of transferring the reagent. In addition, since neither the ultraviolet LED 103 nor the peripheral members thereof which are the outer electrode 104, the inner electrode 105, and the fixing portion 108 are immersed in the reagent, there is no need to wash or clean the ultraviolet LED 103 and the peripheral members thereof when replacing the reagent vessel 101. It is only necessary to pull out the sterilizing mechanism 1 and put it in a new reagent vessel 101, which simplifies maintenance.

(2) Second Embodiment

A second embodiment of the invention will be described in detail with reference to FIGS. 5A to 5D.

In the first embodiment (see FIGS. 4A to 4D and the like), as the configuration of the sterilizing mechanism 1, the ultraviolet LED 103 is connected to two cylindrical electrodes, and the cylindrical electrodes are fixed to the fixing portion 108. In the present embodiment, an ultraviolet LED is attached to a circuit board as a method different from a mounting method of attaching the ultraviolet LED 103 using a conductive structure as power supply electrodes.

FIG. 5A is a diagram schematically showing a configuration of an automatic analysis apparatus according to the present embodiment. Further, FIG. 5D is an enlarged longitudinal sectional view of a mouth peripheral portion D5 of the reagent vessel provided with a sterilizing mechanism. FIG. 5B is a ZX plane cross-sectional view taken along line B5 of FIG. 5D, and FIG. 5C is a ZX plane cross-sectional view taken along line C5 of FIG. 5D.

In FIG. 5A, a sterilizing mechanism 2 according to the present embodiment includes the ultraviolet LEDs 103 which are an ultraviolet ray source, a circuit board 115 having an opening at the center, a metal cylinder 116, and the fixing portion 108. The ultraviolet LEDs 103 are disposed in the reagent vessel 101. The ultraviolet LEDs 103 are connected to the circuit board 115. In the example of FIG. 5A, four ultraviolet LEDs 103 are connected in parallel. The circuit board 115 is a printed board called a heat release substrate or a metal base substrate, and is formed by laminating an insulating layer having a relatively high thermal conductivity on a metal substrate having a high thermal conductivity such as aluminum or copper, on which a wiring such as copper foil is printed. An upper layer of a wiring layer serving as a surface is an insulating layer, and the wiring layer is exposed as an electrode pad in a portion connected to anodes and cathodes of the ultraviolet LEDs 103 and a wiring connection portion for supplying electric power. The heat of the ultraviolet LEDs 103 connected to the electrode pad is rapidly transferred to the metal substrate.

Electrode pads 117 for supplying electric power to the ultraviolet LEDs 103 are provided on the circuit board 115, and the electric power is supplied through the wirings 113. The suction nozzle 102 penetrates the circuit board 115 without touching the circuit board 115, and the heat insulation portion 107 is provided between the circuit board 115 and the suction nozzle 102. The heat insulation portion 107 is also provided between the metal cylinder 116 and the suction nozzle 102. A back side of the circuit board 115, that is, a metal substrate side is attached to the metal cylinder 116, and the metal cylinder 116 is fixed to the fixing portion 108.

The fixing portion 108 may be formed of a metal having high electric conductivity, and the fixing portion 108 and the metal cylinder 116 may be electrically connected, and the fixing portion 108 or the metal cylinder 116 may be substituted for a part of the wirings 113. Further, the fixing portion 108 functions as a heat release portion, and may release heat generated from the ultraviolet LEDs 103 when the ultraviolet rays are emitted through the fixed metal cylinder 116 and the circuit board 115.

As shown in FIGS. 5B to 5D, in the present embodiment, the fixing portion 108 is formed of a metal having high thermal conductivity and electric conductivity, and is substituted for a part of the heat release portion and the wirings 113. The heat insulation portion 110 is provided at a portion where the suction nozzle 102 comes into contact with the fixing portion 108. Although the power supply to the ultraviolet LEDs 103 is performed through the wirings 113 connected to the electrode pads 117 for supplying electric power on a circuit board 215, the fixing portion 108 and the metal cylinder 116 are substituted for a part of the wirings 113.

Most of the heat generated from the ultraviolet LEDs 103 is released into the air through the circuit board 115, the metal cylinder 116, and the fixing portion 108. Since the heat release performance increases as a volume and a surface area of the metal cylinder 116 and the fixing portion 108 increase, it is desirable that the metal cylinder 116 is large in a range that can pass through the mouth of the reagent vessel.

The ultraviolet LEDs 103 are fixed at positions without touching the reagent even when the fixing portion 108 is fixed to the reagent vessel 101 immediately after replacement, that is, even when the liquid level of the reagent in the reagent vessel 101 is at the highest position. Similarly, the circuit board 115 and the metal cylinder 116 are also fixed at positions without touching the reagent.

The ultraviolet LEDs 103, the circuit board 115, and the metal cylinder 116 are not necessarily waterproof. However, when the reagent is contained in the reagent vessel 101 and vibration is applied to the reagent vessel 101 in a state in which the sterilizing mechanism 2 enters the reagent vessel 101, the reagent may touch the ultraviolet LEDs 103, the circuit board 115, and the metal cylinder 116. Therefore, the ultraviolet LEDs 103, the circuit board 115, and the metal cylinder 116 may be waterproof.

The control unit 112 controls any one or a combination of the current, the voltage, and an the energization time supplied to the ultraviolet LEDs 103 to an appropriate value based on a reagent temperature in the suction nozzle 102. Here, the control unit 112 controls any one or a combination of the current, the voltage, and the energization time supplied to the ultraviolet LEDs 103 to an appropriate value such that the reagent temperature in the suction nozzle 102 does not exceed the upper limit of the use temperature determined by the specification of the reagent. Although the reagent in the suction nozzle 102, the ultraviolet LEDs 103, the circuit board 115, the metal cylinder 116, and the fixing portion 108 are insulated by the heat insulation portion 107 and the heat insulation portion 110, the reagent temperature in the suction nozzle 102 rises and saturates as the ultraviolet irradiation time elapses in a manner more gradual as compared with the case without heat insulation. In particular, the temperature rise at the position close to the circuit board 115 is large. Therefore, the reagent temperature in the suction nozzle 102 at the position close to the circuit board 115 is measured using a temperature sensor such as a thermistor. Instead of directly measuring the reagent temperature, the reagent temperature may be indirectly measured by measuring the temperature of the suction nozzle 102 at the position close to the circuit board 215. A measurement result of the temperature sensor is notified to the control unit 112 through the wiring.

The metal cylinder 116 is preferably formed of a metal having high electric conductivity and high thermal conductivity, such as aluminum, copper, or an alloy containing the same.

In the present embodiment, the shape of the mouth of the reagent vessel 101 is a round shape, but may also be a shape other than the round shape. For example, when the shape of the mouth is square, in order to improve heat release performance, and to increase the volume and the surface area within the range capable of passing through the mouth, the circuit board 115 may have the same square shape as the mouth and a shape having an opening at the center, and the metal cylinder 116 may be replaced by a metal having a square tube shape with a round hole. In the present embodiment, the suction nozzle 102 passes through the center of the circuit board 115 and the metal cylinder 116, but may also pass through a position other than center.

Other apparatus configuration, control, operation, material, and the like are the same as those of the first embodiment.

In the present embodiment configured in this way, a similar effect as in the first embodiment can be obtained.

Further, according to the present embodiment, neither the ultraviolet LEDs 103 which are an ultraviolet ray source, nor peripheral members thereof, that is, the circuit board 115, the metal cylinder 116, and the fixing portion 108 functioning as a heat release portion touch the suction nozzle 102, the heat insulation portion 107 are provided between the circuit board 115, the metal cylinder 116 and the suction nozzle 102, and the heat insulation portion 110 is provided between the fixing portion 108 and the suction nozzle 102. Therefore, the effect of the heat generated by the ultraviolet LEDs 103 heating the reagent in the suction nozzle 102 can be prevented. All of the ultraviolet LEDs 103, the circuit board 115, the metal cylinder 116, and the fixing portion 108 are not immersed in the reagent. Therefore, the reagent in the reagent vessel 101 is not directly heated. As a result, it is possible to prevent a change in properties of the reagent due to heating, which is a problem when sterilizing the reagent with the ultraviolet rays.

(3) Third Embodiment

A third embodiment of the invention will be described in detail with reference to FIGS. 6A and 6B.

The first and second embodiments are configured such that the ultraviolet LED, which is an ultraviolet ray source, is disposed in a reagent vessel to be sterilized. The present embodiment shows a sterilizing mechanism for a case where the ultraviolet LED and peripheral members thereof cannot be arranged in the reagent vessel due to the size and the shape of the reagent vessel. For example, when a mouth of a reagent vessel 201 (see FIG. 6A and the like) is small, although the suction nozzle 102 can pass through the mouth, the ultraviolet LED 103 cannot be arranged in the reagent vessel 201.

FIG. 6A is a diagram schematically showing a configuration of an automatic analysis apparatus according to the present embodiment. Further, FIG. 6B is an enlarged ZX plane cross-sectional view of a mouth peripheral portion B6 of the reagent vessel provided with the sterilizing mechanism in FIG. 6A.

In the automatic analysis apparatus 100 according to the present embodiment, a door of a reagent vessel storage chamber of an apparatus main body is opened, the reagent vessel 201 provided by a vendor is installed in the storage chamber, the suction nozzle 102 and a sterilizing mechanism 3 are attached, and the door is closed so that the apparatus can be used. At this time, the user removes a lid attached at the time of distribution from a mouth of the reagent vessel 101, inserts the suction nozzle 102 into the exposed mouth, and attaches the sterilizing mechanism 3 to the mouth.

The sterilizing mechanism 3 includes the ultraviolet LED 103 which is an ultraviolet ray source, a circuit board 215, and a fixing portion 208. The ultraviolet LED 103 is connected to the circuit board 215. The circuit board 215 is a printed circuit board called a heat release substrate or a metal base substrate. An electrode pad for supplying electric power to the ultraviolet LED 103 is provided on a surface of the circuit board 215. Although power supply to the ultraviolet LED 103 is performed through the wirings 113 connected to the electrode pad, the description of the electrode pad is omitted in FIGS. 6A and 6B. The circuit board 215 is fixed to the fixing portion 208, and the circuit board 215 is not adjacent to the suction nozzle 102. The fixing portion 208 functions as a heat release portion, and releases heat generated from the ultraviolet LED 103 to the air when the ultraviolet rays are emitted through the circuit board 215. The fixing portion 208 is formed of a member having high thermal conductivity, and the heat insulation portion 110 is provided at a portion where the suction nozzle 102 comes into the fixing portion 208. Although the power supply to the ultraviolet LED 103 is performed through the wirings 113 connected to the electrode pad for supplying electric power on the surface of the circuit board 215, the fixing portion 208 may be formed of a member having high thermal conductivity and electric conductivity, and the fixing portion 208 may be substituted for a part of the wirings 113.

Since heat release performance increases as the volume and surface area of the fixing portion increase, it is desirable that the fixing portion 208 is large in the range of entering the reagent vessel storage chamber. Further, a heat sink structure may be adopted for the fixing portion 208.

By attaching the fixing portion 208 to the mouth of the reagent vessel 201, the reagent vessel 201 is brought into a sealed state. However, when the suction nozzle 102 sucks the reagent, a gap in which the air enters the reagent vessel 201 is present. The fixing portion 208 is detachably attached to the mouth of the reagent vessel 201.

Since the ultraviolet LED 103 is fixed on the outside of the reagent vessel 201, the ultraviolet LED 103 constantly does not touch the reagent regardless of the liquid amount of the reagent in the reagent vessel 201. Similarly, the circuit board 215 for supplying electric power to the ultraviolet LED 103 is also fixed at a position without touching the reagent.

The ultraviolet LED 103 and the circuit board 215 are not necessarily waterproof. However, when vibration is applied to the reagent vessel 201 in a state where the sterilizing mechanism 3 is attached to the reagent vessel 201, the ultraviolet LED 103 and the circuit board 215 may touch the reagent. Therefore, the ultraviolet LED 103 and the circuit board 215 may be waterproof.

The control unit 112 controls any one or a combination of the current, the voltage, and the energization time supplied to the ultraviolet LED 103 to an appropriate value based on a reagent temperature in the suction nozzle 102. Here, the control unit 112 controls anyone or a combination of the current, the voltage, and the energization time supplied to the ultraviolet LED 103 to an appropriate value such that the reagent temperature in the suction nozzle 102 does not exceed the upper limit of the use temperature determined by the specification of the reagent. Although the reagent in the suction nozzle 102, the ultraviolet LED 103, the circuit board 215, and the fixing portion 208 are insulated by the heat insulation portion 110, the reagent temperature in the suction nozzle 102 rises and saturates as the ultraviolet irradiation time elapses in a manner more gradual as compared with the case without heat insulation. In particular, the temperature rise at the position close to the circuit board 215 is large. Therefore, the reagent temperature in the suction nozzle 102 at the position close to the circuit board 215 is measured using a temperature sensor such as a thermistor. Instead of directly measuring the reagent temperature, the reagent temperature may be indirectly measured by measuring the temperature of the suction nozzle 102 at the position close to the circuit board 215. The measurement result of the temperature sensor is notified to the control unit 112 through the wiring.

The fixing portion 208 is preferably formed of a metal having high thermal conductivity and electric conductivity, such as aluminum, copper, or an alloy including the same. An oxide or a nitride may be used as long as electrical connection is not made to the fixing portion 208.

Other apparatus configuration, control, operation, material, and the like are the same as those of the first and second embodiments.

In the present embodiment configured in this way, the similar effect as in the first and second embodiments can be obtained.

Further, according to the present embodiment, neither the ultraviolet LED 103 which is an ultraviolet ray source nor peripheral members thereof, that is, the circuit board 215, and the fixing portion 208 functioning as a heat release portion touch the suction nozzle 102, the heat insulation portion 110 is provided between the fixing portion 208 and the suction nozzle 102. Therefore, the effect of the heat generated by the ultraviolet LED 103 heating the reagent in the suction nozzle 102 can be prevented. All of the ultraviolet LED 103, the circuit board 215, and the fixing portion 208 are not immersed in the reagent. Therefore, the reagent in the reagent vessel 201 is not directly heated. As a result, it is possible to prevent a change in properties of the reagent due to heating, which is a problem when sterilizing the reagent with the ultraviolet rays.

(4) Fourth Embodiment

A fourth embodiment of the invention will be described in detail with reference to FIGS. 7A to 7E.

The first to third embodiments describe configuration examples in which the reagent vessel has one mouth. The present embodiment is configured such that two or more mouths of the reagent vessel are present, among which a mouth for inserting the suction nozzle and a mouth for attaching the sterilizing mechanism are separated.

FIG. 7A is a diagram schematically showing a configuration of an automatic analysis apparatus according to the present embodiment. Further, FIGS. 7B to 7D are enlarged ZX plane cross-sectional views of a mouth peripheral portion B7 of the reagent vessel provided with the sterilizing mechanism in FIG. 7A.

As shown in FIG. 7A, a reagent vessel 301 of the present embodiment has two mouths at an upper portion thereof.

In the automatic analysis apparatus 100 according to the present embodiment, a door of a reagent vessel storage chamber of an apparatus main body is opened, the reagent vessel 301 provided by a vendor is installed in the storage chamber, the suction nozzle 102 and a sterilizing mechanism 4 are attached, and the door is closed so that the apparatus can be used. At this time, the user removes two lids attached at the time of distribution from two mouths of the reagent vessel 301, inserts the suction nozzle 102 into one of the exposed mouths, and inserts the sterilizing mechanism 4 into the other mouth.

The sterilizing mechanism 4 includes the ultraviolet LEDs 103 which are an ultraviolet ray source, a circuit board 315, a metal cylinder 216, and a fixing portion 308A. The ultraviolet LEDs 103 are connected to the circuit board 315. The circuit board 315 is a printed circuit board called a heat release substrate or a metal base substrate. Electrode pads 117 for supplying electric power to the ultraviolet LEDs 103 are provided on a surface of the circuit board 315, and the power supply to the ultraviolet LEDs 103 is performed through the wirings 113 connected to the electrode pads 117. The circuit board 315 has a through hole through which the wirings 113 can pass. A back side of the circuit board 315 is attached to the metal cylinder 216, and the metal cylinder 216 is fixed to the fixing portion 308A.

The fixing portion 308A may be formed of a metal having high electric conductivity, and the fixing portion 308A and the metal cylinder 216 may be electrically connected, and the fixing portion 308A or the metal cylinder 216 may be substituted for a part of the wirings 113. Further, the fixing portion 308A functions as a heat release portion, and may release heat generated from the ultraviolet LEDs 103 when the ultraviolet rays are emitted through the fixed metal cylinder 216 and the circuit board 315.

The present embodiment describes a case in which the fixing portion 308A is formed of a metal having high thermal conductivity and high electrical conductivity, and is substituted for a part of the heat release portion and the wirings 113. When the fixing portion 308A is formed of a member having high thermal conductivity, most of the heat generated from the ultraviolet LEDs 103 is released into the air through the circuit board 315, the metal cylinder 216, and the fixing portion 308A. As shown in FIGS. 7B to 7D, one of the two wirings connected to the two electrode pads 117 passes through the through hole of the circuit board 315 and the inside of the metal cylinder 216, and the other is electrically connected to the metal cylinder 216. Since the fixing portion 308A is electrically connected to the metal cylinder 216, the fixing portion 308A and the metal cylinder 216 function as a part of the wirings 113.

Since the heat release performance increases as the volume and the surface area of the metal cylinder 216 and the fixing part 308A increase, it is desirable that the metal cylinder 216 is large in a range that can pass through the mouth of the reagent vessel, and that the fixing portion 308A is large in a range of entering the reagent vessel storage chamber. Further, a heat sink structure may be adopted for the fixing portion 308A.

The suction nozzle 102 is fixed by a fixing portion 308B. By attaching the fixing portion 308A and the fixing portion 308B to the mouths of the reagent vessel 301, the reagent vessel 301 is brought into a sealed state. However, when the suction nozzle 102 sucks the reagent, a gap in which the air enters the reagent vessel 301 is present. The fixing portion 308A and the fixing portion 308B are detachable from the mouths of the reagent vessel 301.

In order to simultaneously perform an operation of inserting the sterilizing mechanism 4 and the suction nozzle 102 into the reagent vessel 301, the fixing portion 308A and the fixing portion 308B may be integrated. When integrated, since the fixing portion 308B also functions as a heat release portion, the suction nozzle 102 and the fixing portion having the function of the heat release portion are insulated by providing a heat insulation portion at a portion where the suction nozzle 102 comes into contact with the fixing portion.

The ultraviolet LEDs 103 are fixed at positions without touching the reagent even when the fixing portion 308A is fixed to the reagent vessel 301 immediately after replacement, that is, even when the liquid level of the reagent in the reagent vessel 301 is at the highest position. Similarly, the circuit board 315 and the metal cylinder 216 are also fixed at positions without touching the reagent.

The ultraviolet LEDs 103, the circuit board 315, and the metal cylinder 216 are not necessarily waterproof. However, when vibration is applied to the reagent vessel 301 in a state in which the sterilizing mechanism 4 enters the reagent vessel 301, the reagent may touch the ultraviolet LEDs 103, the circuit board 315, and the metal cylinder 216. Therefore, the ultraviolet LEDs 103, the circuit board 315, and the metal cylinder 216 may be waterproof.

When the fixing portion 308A and the fixing portion 308B are not integrated, the heat generated from the ultraviolet LEDs 103 does not heat the reagent in the suction nozzle 102. Therefore, the control unit 112 does not need to control any one or a combination of the current, the voltage, and the energization time supplied to the ultraviolet LEDs 103 based on the reagent temperature in the suction nozzle 102.

On the other hand, when the fixing portion 308A and the fixing portion 308B are integrated, although a heat insulation portion is provided at a portion where the suction nozzle 102 comes into contact with the fixing portion, the reagent temperature in the suction nozzle 102 rises and saturates as the ultraviolet irradiation time elapses. In order to keep the temperature rise falling within an allowable range, countermeasures are taken such as increasing a thickness of the heat insulation portion, configuring the fixing portion 308B side with a member having low heat release performance, and providing a heat insulation portion between the fixing portion 308A and the fixing portion 308B.

When the rise in reagent temperature inside the suction nozzle 102 exceeds the allowable range even after taking countermeasures, the control unit 112 controls any one or a combination of the current, the voltage, and the energization time supplied to the ultraviolet LEDs 103 to an appropriate value such that the reagent temperature in the suction nozzle 102 does not exceed the upper limit of the use temperature determined by the specification of the reagent. The reagent temperature in the suction nozzle 102 at a position close to the fixing portion is measured using a temperature sensor such as a thermistor. Instead of directly measuring the reagent temperature, the reagent temperature may be indirectly measured by measuring the temperature of the suction nozzle 102 at the position close to the fixing portion. The measurement result of the temperature sensor is notified to the control unit 112 through the wiring.

The metal cylinder 216 is preferably formed of a metal having high electric conductivity and high thermal conductivity, such as aluminum, copper, or an alloy containing the same. When the fixing portion 308A is substituted for a part of the heat release portion and the wirings 113, it is desirable to form the fixing portion 308A with a metal having high electric conductivity and high thermal conductivity, such as aluminum, copper, and alloys containing the same. If the fixing portion 308A is not electrically connected, an oxide or nitride having a high thermal conductivity may be used.

When the fixing portion 308A and the fixing portion 308B are integrated, the heat release performance can be improved by using the same material as the fixing portion 308A. In this case, the heat insulation portion provided at the portion where the suction nozzle 102 comes into contact with the fixing portion is formed of a material having low thermal conductivity such as resin or rubber. When the rise in the reagent temperature in the suction nozzle 102 exceeds the allowable range even if the heat insulation portion is thickened, the fixing portion 308B may be formed of resin and integrated with the fixing portion 308A formed of metal, oxide, or nitride.

Other apparatus configuration, control, operation, material, and the like are the same as those of the first to third embodiments.

In the present embodiment configured in this way, a similar effect as in the first to third embodiments can be obtained.

Further, according to the present embodiment, both the ultraviolet LEDs 103 which are the ultraviolet ray source, and peripheral members thereof, that is, the circuit board 315 and the fixing portion 308A functioning as a heat release portion are isolated from the reagent in the suction nozzle 102 by an isolation portion as a heat insulation structure. Therefore, the heat generated by the ultraviolet LEDs 103 does not heat the reagent in the suction nozzle 102. Even when the fixing portion 308A and the fixing portion 308B are integrated, since the heat insulation portion is provided between the fixing portion and the suction nozzle 102, the effect of heating the reagent in the suction nozzle 102 due to heat generated by the ultraviolet LEDs 103 can be prevented. All of the ultraviolet LEDs 103, the circuit board 315, and the fixing portion 308A are not immersed in the reagent. Even when the fixing portion 308A and the fixing portion 308B are integrated, the fixing portion is not immersed in the reagent. Therefore, the reagent in the reagent vessel 301 is not directly heated. As a result, it is possible to prevent a change in properties of the reagent due to heating, which is a problem when sterilizing the reagent with the ultraviolet rays.

(5) Fifth Embodiment

A fifth embodiment of the invention will be described in detail with reference to FIGS. 8A and 8B.

In the fourth embodiment, the suction nozzle is inserted into one mouth of the reagent vessel having two mouths at the upper portion, and the sterilizing mechanism is inserted into the other mouth. The present embodiment shows a sterilizing mechanism for a case where a mouth of a reagent vessel 401 is small and the ultraviolet LED 103 cannot be disposed in the reagent vessel 401.

FIG. 8A is a diagram schematically showing a configuration of an automatic analysis apparatus according to the present embodiment. Further, FIG. 8B is an enlarged ZX plane cross-sectional view of a mouth peripheral portion B8 of the reagent vessel provided with the sterilizing mechanism in FIG. 8A.

In the automatic analysis apparatus 100 according to the present embodiment, the door of the reagent vessel storage chamber of the apparatus main body is opened, the reagent vessel 401 provided by a vendor is installed in the storage chamber, the suction nozzle 102 and a sterilizing mechanism 5 are attached, and the door is closed so that the apparatus can be used. Therefore, the user removes two lids attached at the time of distribution from two mouths of the reagent vessel 401, inserts the suction nozzle 102 into one of the exposed mouths, and attaches the sterilizing mechanism 5 to the other mouth.

The sterilizing mechanism 5 includes the ultraviolet LED 103 which is an ultraviolet ray source, a circuit board 415, and a fixing portion 408A. The ultraviolet LED 103 is connected to the circuit board 415. The circuit board 415 is a printed circuit board called a heat release substrate or a metal base substrate. An electrode pad for supplying electric power to the ultraviolet LED 103 is provided on a surface of the circuit board 415. Although the power supply to the ultraviolet LED 103 is performed through the wirings 113 connected to the electrode pad, the description of the electrode pad is omitted in FIGS. 8A and 8B. The circuit board 415 is fixed to the fixing portion 408A.

The fixing portion 408A may be formed of a metal having high electric conductivity, and the fixing portion 408A may be substituted for a part of the wirings 113. Further, the fixing portion 408A functions as a heat release portion, and may release heat generated from the ultraviolet LED 103 when the ultraviolet rays are emitted through the fixed circuit board 415.

The present embodiment describes a case where the fixing portion 408A is formed of a metal having high thermal conductivity and electric conductivity. When the fixing portion 408A is formed of a member having high thermal conductivity, most of the heat generated from the ultraviolet LED 103 is released into the air through the circuit board 415 and the fixing portion 408A. The fixing portion 408A may be substituted for a part of the wirings 113.

Since the heat release performance increases as the volume and surface area of the fixing portion 408A increases, it is desirable that the fixing portion 408A is large in a range of entering the reagent vessel storage chamber. Further, a heat sink structure may be adopted for the fixing portion 408A.

The suction nozzle 102 is fixed by a fixing portion 408B. By attaching the fixing portion 408A and the fixing portion 408B to the mouths of the reagent vessel 401, the reagent vessel 401 is brought into a sealed state. However, when the suction nozzle 102 sucks the reagent, a gap in which the air enters the reagent vessel 401 is present. The fixing portion 408A and the fixing portion 408B are detachably attached to the mouths of the reagent vessel 401.

In order to simultaneously perform an operation of inserting the sterilizing mechanism 5 and the suction nozzle 102 into the reagent vessel 401, the fixing portion 408A and the fixing portion 408B may be integrated. When integrated, since the fixing portion 408B also functions as a heat release portion, the suction nozzle 102 and the fixing portion having the function of the heat release portion are insulated by providing a heat insulation portion at a portion where the suction nozzle 102 comes into contact with the fixing portion.

Since the ultraviolet LED 103 is fixed on the outside of the reagent vessel 401, the ultraviolet LED 103 constantly does not touch the reagent regardless of the liquid amount of the reagent in the reagent vessel 401. Similarly, the circuit board 415 for supplying electric power to the ultraviolet LED 103 is also fixed at a position without touching the reagent.

The ultraviolet LED 103 and the circuit board 415 are not necessarily waterproof. However, when vibration is applied to the reagent vessel 401 in a state where the sterilizing mechanism 5 is attached to the reagent vessel 401, the ultraviolet LED 103 and the circuit board 415 may touch the reagent. Therefore, the ultraviolet LED 103 and the circuit board 415 may be waterproof.

When the fixing portion 408A and the fixing portion 408B are not integrated, the heat generated from the ultraviolet LED 103 does not heat the reagent in the suction nozzle 102. Therefore, the control unit 112 does not need to control any one or a combination of the current, the voltage, and the energization time supplied to the ultraviolet LED 103 based on the reagent temperature in the suction nozzle 102.

On the other hand, when the fixing portion 408A and the fixing portion 408B are integrated, although a heat insulation portion is provided at a portion where the suction nozzle 102 comes into contact with the fixing portion, the reagent temperature in the suction nozzle 102 rises and saturates as the ultraviolet irradiation time elapses. In order to keep the temperature rise falling within an allowable range, countermeasures are taken such as increasing a thickness of the heat insulation portion, configuring the fixing portion 408B side with a member having low heat release performance, and providing a heat insulation portion between the fixing portion 408A and the fixing portion 408B.

When the rise in reagent temperature inside the suction nozzle 102 exceeds the allowable range even after taking countermeasures, the control unit 112 controls any one or a combination of the current, the voltage, and the energization time supplied to the ultraviolet LED 103 to an appropriate value such that the reagent temperature in the suction nozzle 102 does not exceed the upper limit of the use temperature determined by the specification of the reagent. The reagent temperature in the suction nozzle 102 at a position close to the fixing portion is measured using a temperature sensor such as a thermistor. Instead of directly measuring the reagent temperature, the reagent temperature may be indirectly measured by measuring the temperature of the suction nozzle 102 at the position close to the fixing portion. the measurement result of the temperature sensor is notified to the control unit 112 through the wiring.

When the fixing portion 408A is substituted for a part of the heat release portion and the wirings 113, it is desirable to form the fixing portion 408A with a metal having high electric conductivity and high thermal conductivity, such as aluminum, copper, and alloys containing the same. If the fixing portion 408A is not electrically connected, an oxide or nitride having a high thermal conductivity may be used.

When the fixing portion 408A and the fixing portion 408B are integrated, the heat release performance can be improved by using the same material as the fixing portion 408A. In this case, the heat insulation portion provided at the portion where the suction nozzle 102 comes into contact with the fixing portion is formed of a material having low thermal conductivity such as resin or rubber. When the rise in the reagent temperature in the suction nozzle 102 exceeds the allowable range even if the heat insulation portion is thickened, the fixing portion 408B may be formed of resin and integrated with the fixing portion 408A formed of metal, oxide, or nitride.

Other apparatus configuration, control, operation, material, and the like are the same as those of the fourth embodiment.

In the present embodiment configured in this way, a similar effect as in the fourth embodiment can be obtained.

Further, according to the present embodiment, both the ultraviolet LED 103 which is the ultraviolet ray source, and peripheral members thereof, that is, the circuit board 415 and the fixing portion 408A functioning as a heat release portion are isolated from the reagent in the suction nozzle 102 by an isolation portion as a heat insulation structure. Therefore, the heat generated by the ultraviolet LED 103 does not heat the reagent in the suction nozzle 102. Even when the fixing portion 408A and the fixing portion 408B are integrated, since the heat insulation portion is provided between the fixing portion and the suction nozzle 102, the effect of heating the reagent in the suction nozzle 102 due to heat generated by the ultraviolet LED 103 can be prevented. All of the ultraviolet LEDs 103, the circuit board 415, and the fixing portion 408A are not immersed in the reagent. Even when the fixing portion 408A and the fixing portion 408B are integrated, the fixing portion is not immersed in the reagent. Therefore, the reagent in the reagent vessel 401 is not directly heated. As a result, it is possible to prevent a change in properties of the reagent due to heating, which is a problem when sterilizing the reagent with the ultraviolet rays.

(6) Sixth Embodiment

A sixth embodiment of the invention will be described in detail with reference to FIGS. 9A to 9E.

The first to fifth embodiments show configurations in which the mouth for taking out the reagent is located at the upper portion of the reagent vessel. The present embodiment shows a configuration of a sterilizing mechanism for a case where a mouth for taking out the reagent is located at a lower portion of a reagent vessel.

FIG. 9A is a diagram schematically showing a configuration of an automatic analysis apparatus according to the present embodiment. Further, FIGS. 9B to 9D are enlarged ZX plane cross-sectional views of a mouth peripheral portion B9 of the reagent vessel provided with the sterilizing mechanism in FIG. 9A.

As shown in FIG. 9A, in a reagent vessel 501 of the present embodiment, a mouth for taking out the reagent is located at a lower portion, and a mouth for introducing the air is located at an upper portion.

In the automatic analysis apparatus 100 according to the present embodiment, a door of a reagent vessel storage chamber of an apparatus main body is opened, the reagent vessel 501 provided by a vendor is installed in the storage chamber, the suction nozzle 102 and a sterilizing mechanism 6 are attached, and the door is closed so that the apparatus can be used. The reagent vessel 501 has one mouth at the upper portion and one at the lower portion, each attached with a lid. The lower mouth is a mouth for taking out the reagent. By removing the lid and attaching the apparatus main body with the mouth facing downward, the reagent can be taken out from the suction nozzle 102. The upper mouth is a mouth for taking in air into the reagent vessel 501 when the reagent is taken out from the reagent vessel 501 via the suction nozzle 102. When the reagent is used without ultraviolet ray sterilization, the reagent is used with the upper mouth loosened. At this time, the user removes the two lids attached at the time of distribution from the two mouths of the reagent vessel 501, attaches the reagent vessel 501 to the apparatus main body, and attaches the sterilizing mechanism 6 to the exposed upper mouth.

The sterilizing mechanism 6 includes the ultraviolet LED 103 which is an ultraviolet ray source, a circuit board 515, a metal cylinder 316, and a fixing portion 508. The ultraviolet LED 103 is connected to the circuit board 515. The circuit board 515 is a printed circuit board called a heat release substrate or a metal base substrate. Electrode pads 117 for supplying electric power to the ultraviolet LED 103 are provided on a surface of the circuit board 515, and the power supply to the ultraviolet LED 103 is performed through the wirings 113 connected to the electrode pads 117. The circuit board 515 has a through hole through which the wirings 113 can pass. A back side of the circuit board 515 is attached to the metal cylinder 316, and the metal cylinder 316 is fixed to the fixing portion 508.

The fixing portion 508 may be formed of a metal having high electric conductivity, and the fixing portion 508 and the metal cylinder 316 may be electrically connected, and the fixing portion 508 or the metal cylinder 316 may be substituted for a part of the wirings 113. Further, the fixing portion 508 may function as a heat release portion and release heat generated from the ultraviolet LED 103 when the ultraviolet rays are emitted through the fixed metal cylinder 316 and the circuit board 515.

The present embodiment describes a case in which the fixing portion 508 is formed of a metal having high thermal conductivity and high electrical conductivity, and is substituted for a part of the heat release portion and the wirings 113. When the fixing portion 508 is formed of a member having high thermal conductivity, most of the heat generated from the ultraviolet LED 103 is released into the air through the circuit board 515, the metal cylinder 316, and the fixing portion 508. As shown in FIGS. 9B to 9E, one of the two wirings connected to the two electrode pads 117 passes through the through hole of the circuit board 515 and the inside of the metal cylinder 316, and the other is electrically connected to the metal cylinder 316. Since the fixing portion 508 is electrically connected to the metal cylinder 316, the fixing portion 508 and the metal cylinder 316 function as a part of the wirings 113.

Since the heat release performance increases as the volume and surface area of the metal cylinder 316 and the fixing part 508 increase, it is desirable that the metal cylinder 316 is large in a range that can pass through the mouth of the reagent vessel, and that the fixing portion 508 is large in a range of entering the reagent vessel storage chamber. Further, a heat sink structure may be adopted for the fixing portion 508.

By attaching the reagent vessel 501 to the apparatus main body and attaching the fixing portion 508 to the upper mouth of the reagent vessel 501, the reagent vessel 501 is brought into a sealed state. However, when the suction nozzle 102 sucks the reagent, a gap in which the air enters the reagent vessel 501 is present. The fixing portion 508 is detachably attached to the upper mouth of the reagent vessel 501.

The ultraviolet LED 103 is fixed at a position without touching the reagent even when the fixing portion 508 is fixed to the reagent vessel 501 immediately after replacement, that is, even when a liquid level of the reagent in the reagent vessel 501 is at a highest position. Similarly, the circuit board 515 and the metal cylinder 316 are also fixed at positions without touching the reagent.

The ultraviolet LED 103, the circuit board 515, and the metal cylinder 316 are not necessarily waterproof. However, when vibration is applied to the reagent vessel 501 in a state in which the sterilizing mechanism 6 enters the reagent vessel 501, the reagent may touch the ultraviolet LED 103, the circuit board 515, and the metal cylinder 316. Therefore, the ultraviolet LED 103, the circuit board 515, and the metal cylinder 316 may be waterproof.

The heat generated from the ultraviolet LED 103 does not heat the reagent in the suction nozzle 102. Therefore, the control unit 112 does not need to control any one or a combination of the current, the voltage, and the energization time supplied to the ultraviolet LED 103 based on the reagent temperature in the suction nozzle 102.

The metal cylinder 316 is preferably formed of a metal having high electric conductivity and high thermal conductivity, such as aluminum, copper, or an alloy containing the same. When the fixing portion 508 is substituted for a part of the heat release portion and the wirings 113, it is desirable to form the fixing portion 508 with a metal having high electric conductivity and high thermal conductivity, such as aluminum, copper, and alloys containing the same. If the fixing portion 508 is not electrically connected, an oxide or nitride having a high thermal conductivity may be used.

Other apparatus configuration, control, operation, material, and the like are the same as those of the second embodiment.

In the present embodiment configured in this way, the similar effect as in the second embodiment can be obtained.

Further, according to the present embodiment, both the ultraviolet LED 103 which is the ultraviolet ray source, and peripheral members thereof, that is, the circuit board 515 and the fixing portion 508 functioning as a heat release portion are isolated from the reagent in the suction nozzle 102 by an isolation portion as a heat insulation structure. Therefore, the heat generated by the ultraviolet LED 103 does not heat the reagent in the suction nozzle 102. All of the ultraviolet LED 103, the circuit board 515, and the fixing portion 508 are not immersed in the reagent. Therefore, the reagent in the reagent vessel 501 is not directly heated. As a result, it is possible to prevent a change in properties of the reagent due to heating, which is a problem when sterilizing the reagent with the ultraviolet rays.

(7) Seventh Embodiment

A seventh embodiment of the invention will be described in detail with reference to FIG. 10.

In the sixth embodiment, the configuration of the reagent vessel in which the mouth for taking out the reagent is located at the lower portion, and the mouth for introducing air is located at the upper portion is shown. The present embodiment shows a configuration in which a small hole is present instead of a mouth for introducing air.

FIG. 10 is a diagram schematically showing a configuration of an automatic analysis apparatus according to the present embodiment.

As shown in FIG. 10, in a reagent vessel 601 of the present embodiment, a mouth for taking out the reagent is located at a lower portion, and an air hole 118 for introducing air is located at an upper portion. In the automatic analysis apparatus 100, a door of a reagent vessel storage chamber of an apparatus main body is opened, the reagent vessel 601 provided by a vendor is installed in the storage chamber, the suction nozzle 102 and a sterilizing mechanism 7 are attached, and the door is closed so that the apparatus can be used. The reagent vessel 601 has the air hole 118 at the upper portion thereof and the mouth at the lower portion, each with a lid attached thereto. The lower mouth is a mouth for taking out the reagent. By removing the lid and attaching the apparatus main body with the mouth facing downward, the reagent can be taken out from the suction nozzle 102. The upper air hole 118 is a hole for taking in air into the reagent vessel 601 when the reagent is taken out from the reagent vessel 601 via the suction nozzle 102. Therefore, the lid attached at the time of distribution is removed from the mouth of the reagent vessel 601, the reagent vessel 601 is attached to the apparatus main body, and the sterilizing mechanism 7 is attached to the upper portion of the air hole, that is, outside the reagent vessel 601.

The sterilizing mechanism 7 includes the ultraviolet LED 103 which is an ultraviolet ray source, a circuit board 615, and a fixing portion 608. The ultraviolet LED 103 is connected to the circuit board 615. The circuit board 615 is a printed circuit board called a heat release substrate or a metal base substrate. An electrode pad for supplying electric power to the ultraviolet LED 103 is provided on a surface of the circuit board 615. Although the power supply to the ultraviolet LED 103 is performed through the wirings 113 connected to the electrode pad, the description of the electrode pad is omitted in FIG. 10. The circuit board 615 is fixed to the fixing portion 608.

The fixing portion 608 may be formed of a metal having high electric conductivity, and the fixing portion 608 may be substituted for a part of the wirings 113. Further, the fixing portion 608 may function as a heat release portion and release heat generated from the ultraviolet LED 103 when the ultraviolet rays are emitted through the fixed circuit board 615.

In the present embodiment, a case in which the fixing portion 608 is formed of a metal having high thermal conductivity and high electrical conductivity, and is substituted for a part of the heat release portion and the wirings 113 will be described. When the fixing portion 608 is formed of a member having high thermal conductivity, most of the heat generated from the ultraviolet LED 103 is released into the air through the circuit board 615, and the fixing portion 608. The fixing portion 608 may be substituted for a part of the wirings 113.

Since heat release performance increases as the volume and surface area of the fixing portion 608 increase, it is desirable that the fixing portion 608 is large in the range of entering the reagent vessel storage chamber. Further, a heat sink structure may be adopted for the fixing portion 608.

By attaching the reagent vessel 601 to the apparatus main body and attaching the fixing portion 608 to the upper mouth of the reagent vessel 601, the reagent vessel 601 is brought into a sealed state. However, when the suction nozzle 102 sucks the reagent, a gap in which the air enters the reagent vessel 601 is present. The fixing portion 608 is detachable from the upper mouth of the reagent vessel 601.

Since the ultraviolet LED 103 is fixed on the outside of the reagent vessel 601, the ultraviolet LED 103 constantly does not touch the reagent regardless of the liquid amount of the reagent in the reagent vessel 601. Similarly, the circuit board 615 for supplying electric power to the ultraviolet LED 103 is also fixed at a position without touching the reagent.

The ultraviolet LED 103 and the circuit board 615 are not necessarily waterproof. However, when vibration is applied to the reagent vessel 601 in a state where the sterilizing mechanism 5 is attached to the reagent vessel 601, the ultraviolet LED 103 and the circuit board 615 may touch the reagent. Therefore, the ultraviolet LED 103 and the circuit board 615 may be waterproof.

The heat generated from the ultraviolet LED 103 does not heat the reagent in the suction nozzle 102. Therefore, the control unit 112 does not need to control any one or a combination of the current, the voltage, and the energization time supplied to the ultraviolet LED 103 based on the reagent temperature in the suction nozzle 102.

When the fixing portion 608 is substituted for a part of the heat release portion and the wirings 113, it is desirable to form the fixing portion 608 with a metal having high electric conductivity and high thermal conductivity, such as aluminum, copper, and alloys containing the same. If the fixing portion 608 is not electrically connected, an oxide or nitride having a high thermal conductivity may be used.

Other apparatus configuration, control, operation, and material are the same as those of the second embodiment.

In the present embodiment configured in this way, the similar effect as in the second embodiment can be obtained.

Further, according to the present embodiment, both the ultraviolet LED 103 which is the ultraviolet ray source, and peripheral members thereof, that is, the circuit board 615 and the fixing portion 608 functioning as a heat release portion are isolated from the reagent in the suction nozzle 102 by an isolation portion as a heat insulation structure. Therefore, the heat generated by the ultraviolet LED 103 does not heat the reagent in the suction nozzle 102. All of the ultraviolet LED 103, the circuit board 615, and the fixing portion 608 are not immersed in the reagent. Therefore, the reagent in the reagent vessel 601 is not directly heated. As a result, it is possible to prevent a change in properties of the reagent due to heating, which is a problem when sterilizing the reagent with the ultraviolet rays.

(8) Eighth Embodiment

An eighth embodiment of the invention will be described in detail with reference to FIG. 11.

The first to seventh embodiments show configurations in which the reagent vessel is fixed in the apparatus and the suction nozzle is also fixed to the reagent vessel. The present embodiment shows a configuration in which a reagent vessel is disposed on a reagent disk in which a plurality of reagent vessels are arranged on a rotating disk. In such a configuration, only when each reagent is used, the suction nozzle is inserted into a mouth of the reagent vessel to suck the reagent, and discharges the reagent to, for example, a reaction vessel that causes a sample to react with the reagent.

FIG. 11 is a diagram schematically showing a configuration around a reagent disk selectively excerpting from a configuration of an automatic analysis apparatus according to the present embodiment.

Here, the reagent disk according to the present embodiment is capable of disposing a plurality of reagent vessels side by side on a substrate, and includes a mechanism for rotationally moving a disk such that an arbitrary reagent vessel is positioned at a predetermined reagent suction position.

In the automatic analysis apparatus 100 of the present embodiment, a cover that covers the apparatus main body is opened, and a reagent vessel 701 provided by a vendor is disposed in a reagent disk in a reagent storage unit 119 of the apparatus main body and used. Therefore, the user removes a lid attached at the time of distribution from a mouth of the reagent vessel 701 and disposes on the reagent disk.

A reagent dispensing mechanism 120 having a suction nozzle 202 is used for sucking and discharging the reagent. The reagent dispensing mechanism 120 discharges the sucked reagent to a reaction vessel. In FIG. 11, a description of the reaction vessel is omitted.

A sterilizing mechanism 8 including an ultraviolet irradiation unit 121 can irradiate the mouth of the reagent vessel 701 with the ultraviolet rays without being attached to the reagent vessel 701. An ultraviolet LED is adopted as an ultraviolet ray source, and a wavelength of the ultraviolet rays is selected, for example, as in the first embodiment. When a plurality of types of reagents necessary for sterilization are present and suitable wavelengths thereof are different, a plurality of ultraviolet LEDs having different wavelengths are mounted.

When the ultraviolet irradiation unit 121 emits the ultraviolet rays toward the mouth of a reagent vessel 701A containing the reagent to be sterilized, a tip of the ultraviolet irradiation unit 121 is fixed to an upper portion of the mouth of the reagent vessel 701A and at a position not to be inserted. When the reagent disk is irradiated with the ultraviolet rays, the reagent disk may be rotating or stopped. When the ultraviolet rays are emitted during rotation, the ultraviolet rays are emitted while the mouth of the reagent vessel 701A passes under the ultraviolet irradiation unit 121. Therefore, when the plurality of reagents having different wavelengths are irradiated with the ultraviolet rays during rotating of the reagent disk, a plurality of ultraviolet LEDs having different wavelengths are switched, and the ultraviolet rays having a wavelength suitable for each reagent are emitted.

Since the ultraviolet rays having a sterilizing effect are harmful to the human body, in order to prevent the user from being exposed to the ultraviolet rays, the automatic analysis apparatus may be provided with an interlock mechanism for extinguishing the ultraviolet LED when a cover that covers the apparatus main body is opened. The cover is formed of resin, metal, or the like for shielding the ultraviolet rays.

According to the present embodiment, since the reagent dispensing mechanism 120 including the ultraviolet irradiation unit 121 configured by the ultraviolet LED as the ultraviolet ray source and the suction nozzle 202 is isolated by the isolation portion as the heat insulation structure, the heat generated by the ultraviolet LED or the peripheral members constituting the sterilizing mechanism 8 has no effect of heating the reagent in the suction nozzle 202. The ultraviolet irradiation unit 121 is not immersed in the reagent. As a result, it is possible to prevent a change in properties of the reagent due to heating, which is a problem when sterilizing the reagent with the ultraviolet rays.

(9) Ninth Embodiment

A ninth embodiment of the invention will be described in detail with reference to FIG. 12A, 12B, 13A, 13B, and FIGS. 14A to 14D.

In the first to eighth embodiments, the ultraviolet LED is used as the ultraviolet ray source in order to sterilize the reagent in the reagent vessel with the ultraviolet rays. In contrast, in consideration of the fact that the ultraviolet LED has a higher directivity of ultraviolet irradiation as compared with an ultraviolet ray lamp, the number and arrangement of the ultraviolet LEDs and an inclination angle with respect to a horizontal plane are determined in consideration of a shape and a size of the reagent vessel, a positional relationship between the ultraviolet LED and the suction nozzle, and an entry route of the microorganisms.

What is particularly important among the shape and size of the reagent vessel is a presence and a position of a mouth at an upper portion of the reagent vessel into which a sterilizing mechanism can be inserted.

As in the first, second, fourth, and sixth embodiments, if a mouth is present at the upper portion of the reagent vessel into which the sterilizing mechanism can be inserted when the reagent vessel is fixed to the apparatus main body, a higher sterilizing effect can be obtained in shorter irradiation time by putting the sterilizing mechanism in the reagent vessel.

Meanwhile, as in the third, fifth, seventh, and eighth embodiments, if the upper mouth of the reagent vessel is too small to insert a sterilizing mechanism, or if an air hole is present instead of a mouth on the upper portion, when the embodiment is applied to the reagent disk, irradiation is performed from outside the reagent vessel. In this case, an ultraviolet irradiation range in the reagent vessel is determined by the size of the mouth or hole and a distance between the mouth and the ultraviolet ray source. In addition, as compared with the case of irradiation from the inside of the reagent vessel, since an amount of ultraviolet rays directly incident on the reagent is reduced, relatively long irradiation time is required in order to obtain a sterilizing effect.

FIGS. 12A and 12B are longitudinal sectional views showing exemplified positional relationships between the ultraviolet LED and the reagent vessel according to the present embodiment.

With reference to FIGS. 12A and 12B, an irradiation range when a mouth is present in the upper center of the reagent vessel and the ultraviolet LED is disposed inside the reagent vessel is compared with an irradiation range when the ultraviolet LED is disposed outside the reagent vessel for the same reagent vessel. Here, peripheral members of the suction nozzle and the ultraviolet ray source are omitted.

In FIG. 12A, a reagent vessel 801 is filled with a reagent up to a reagent level 122, and the ultraviolet LED 103 is disposed in the reagent vessel and above the reagent level 122. A perpendicular line 123 on the surface of the ultraviolet LED 103, that is, an orientation is right below. In the present embodiment, a directional half-value angle is used as a standard of the irradiation range. The ultraviolet LED 103 has a strongest ultraviolet ray intensity in the direction of the perpendicular line 123. The intensity decreases as an angle with the perpendicular line 123 increases, and is halved at ±60°, which is the directional half-value angle. In the present embodiment, the irradiation range is an ultraviolet ray 124 whose intensity is halved and the inside of an inner wall of the reagent vessel 801. In FIG. 12B, the arrangement of the ultraviolet LED 103 is disposed outside the reagent vessel 801. The reagent level 122 is the same as in FIG. 12A. The ultraviolet ray 124 whose intensity is halved is emitted to the inner wall of the mouth portion. The drawing shows an ultraviolet ray 125 entering below a mouth projection. In this case, a space surrounded by the ultraviolet ray 124, the ultraviolet light 125, and the inner wall of the reagent vessel 701 becomes the irradiation range. The larger the mouth is, and the closer the ultraviolet LED 103 is to the reagent vessel 801, the wider the irradiation range for the reagent is.

In FIGS. 12A and 12B, the reagent outside the irradiation range is hardly sterilized by the ultraviolet rays, but is not totally not ultraviolet-sterilized at all. Even with respect to the reagent outside the irradiation range, the ultraviolet rays having an intensity of less than half of the direction of the perpendicular line 123 and the ultraviolet rays incident on the inner wall of the reagent vessel 801 and reflected or scattered are incident on the outside of the irradiation range, which may enable practical ultraviolet sterilization.

When the irradiation dose to the reagent in the irradiation range is no less than the ultraviolet irradiation dose necessary for sterilization of the reagent while the irradiation dose to a part of the reagent outside the irradiation range is less than the ultraviolet irradiation dose necessary for sterilization of the reagent, the number and arrangement of the ultraviolet LEDs and the inclination angle with respect to the horizontal plane are changed.

FIGS. 13A and 13B are longitudinal sectional views showing another exemplified positional relationships between the reagent vessel and the ultraviolet LED according to the present embodiment.

As compared with FIGS. 12A and 12B, FIGS. 13A and 13B show an example of an arrangement in which the number of the ultraviolet LEDs is increased to two and the orientation of the ultraviolet LEDs is adjusted to an angle that is not directly below, such that all the reagents are included in the irradiation range. A mouth is present in the upper center of the reagent vessel 801, and both the ultraviolet LEDs 103A and 103B are arranged in the reagent vessel 801 and above the reagent level 122. As a mounting method of disposing a plurality of ultraviolet LEDs at different angles, a method of connecting an ultraviolet LED to a cylindrical electrode as shown in the second embodiment is suitable. The angle can be adjusted by inclining attachment positions of the ultraviolet LEDs by cutting processing.

When the ultraviolet LEDs are disposed in the reagent vessel, all the reagents in the reagent vessel are included in the irradiation range, and the irradiation dose is no less than the ultraviolet irradiation dose necessary for sterilization of the reagent, the number and angle of the required ultraviolet LEDs are important depending on the shape and size of the reagent vessel, the position of the mouth, and the positional relationship between the ultraviolet LED and the suction nozzle. For example, when the position of the mouth is changed from the upper center of the reagent vessel shown in FIG. 13A to the upper right side shown in FIG. 13B, an inclination angle of the ultraviolet LED 103A with respect to a horizontal plane is increased, and the angle of the ultraviolet LED 103B is reduced.

FIGS. 14A to 14D are longitudinal sectional views showing still another exemplified positional relationship between the ultraviolet LED and the reagent vessel according to the present embodiment.

For example, as shown in FIG. 14A, a case will be described in which ultraviolet sterilization is applied to a reagent vessel having a structure in which an inner wall is bonded by being dented from front and back surfaces of the reagent vessel in order to increase rigidity of the reagent vessel, improve handleability, and identify the reagent vessel. A reagent vessel 901 has dents 126 near the center, and a mouth is on the upper right side. The reagent vessel 901 is the same as the reagent vessel 801 of FIG. 13B except that the reagent vessel 901 has the dents 126. FIG. 14B shows the reagent vessel 901 of FIG. 14A in which the ultraviolet LED is arranged in the same manner as in FIG. 13B. Due to the dents 126, a shadow region 127 is generated in which the ultraviolet rays are not directly emitted. The reagent in the shadow region 127 is hardly sterilized by the ultraviolet rays, but is not totally not ultraviolet-sterilized at all. The ultraviolet rays incident on the inner wall of the reagent vessel 901 and reflected or scattered are also incident on the shadow region, which may enable practical ultraviolet sterilization. In order to increase the ultraviolet irradiation dose of the shadow region 127, it is possible to increase the number of ultraviolet LEDs or to adjust the angle. An example of increasing the ultraviolet irradiation dose by adjusting the angle will be described. In FIG. 14B, the ultraviolet rays with a strongest intensity emitted by the ultraviolet LED 103A are ultraviolet rays in a direction of a perpendicular line 123A on the surface of the ultraviolet LED 103A. The ultraviolet rays are incident on the inner wall of the dents 126 to be reflected or scattered. Ultraviolet rays 128 due to reflection and scattering are not directly incident on the shadow region 127. On the other hand, as shown in FIG. 14C, as compared with FIG. 14B, when an inclination angle of the ultraviolet LED 103A with respect to a horizontal plane is increased and the ultraviolet rays having the strongest intensity emitted by the ultraviolet LED 103A is incident on the inner wall of the reagent vessel 801 near the shadow region 127, the ultraviolet rays 128 due to the generated reflection or scattering are incident on the shadow region 127, so that the ultraviolet irradiation dose increases.

It is important to use the reflected or scattered ultraviolet rays other than the directly incident ultraviolet rays not only in the case where the shadow region is irradiated with the ultraviolet rays. As a method of improving the intensity of the ultraviolet rays due to reflection or scattering in the reagent vessel, a material of the reagent vessel may be an ultraviolet ray reflection member, or the outside of the reagent vessel may be surrounded by the ultraviolet ray reflection member. The former can improve the reflectance of the inner wall of the reagent vessel, and the latter has an effect of returning the ultraviolet rays transmitted through the reagent vessel to the inside of the reagent vessel again. As the ultraviolet ray reflection member, a fluorine-based resin having a high reflectance with respect to the ultraviolet rays or a metal is used. More specifically, the ultraviolet ray reflection member is PTFE or aluminum.

Next, a method of arranging the ultraviolet LED in consideration of a positional relationship between the ultraviolet LED and the suction nozzle will be described. In the configuration in which the suction nozzle is inserted into the reagent vessel as in the first to fifth embodiments, a shadow region by the suction nozzle may be formed on a side surface or a bottom surface of the reagent vessel. On the other hand, in a configuration in which the suction nozzle is not inserted into the reagent vessel as in the sixth and seventh embodiments, the shadow region by the suction nozzle is not formed. In the configuration in which the suction nozzle is inserted into the reagent vessel, when the ultraviolet LEDs are disposed so as to surround the suction nozzle as in the first and second embodiments, a shadow region other than the shadow region formed on the bottom surface of the reagent vessel can be eliminated. On the other hand, when the ultraviolet LED is not disposed so as to surround the suction nozzle as in the third to fifth embodiments, the shadow region on the side surface and the bottom surface of the reagent vessel cannot be eliminated. The reagent in the shadow region is hardly sterilized by the ultraviolet rays, but is not totally not ultraviolet-sterilized at all. The ultraviolet rays incident on the inner wall of the reagent vessel and reflected or scattered are also incident on the shadow region, which may enable practical ultraviolet sterilization.

Next, a method of arranging the ultraviolet LED in consideration of an entry route in the case where an entry route of a microorganism is known will be described. Entry routes of microorganisms into the reagent vessel include a (Route 1) where the microorganisms enter with air from the mouth and the air hole of the reagent vessel, a (Route 2) where the microorganisms are attached to the surface of the suction nozzle and enter when the suction nozzle is inserted into the reagent vessel, and a (Route 3) where the microorganisms flow reversely and come out of the suction nozzle. For (Route 1), as shown in FIG. 12A, it is effective to irradiate the entire opening of the mouth and the air hole from the outside of the reagent vessel with the ultraviolet rays. As shown in FIGS. 13A and 13B, it is also effective to irradiate the entire surface of the liquid level of the reagent or a surface of air above the liquid level with the ultraviolet rays. For (route 2), a configuration in which the ultraviolet LEDs are arranged so as to surround the suction nozzle as shown in FIGS. 4A to 4D and FIGS. 5A to 5D is effective. It is effective to irradiate all side surfaces of the suction nozzle below the height at which the suction nozzle is immersed in the reagent with the ultraviolet rays. For (Route 3), as shown in FIGS. 4A to 4D and FIGS. 5A to 5D, it is effective to arrange ultraviolet LEDs so as to surround the suction nozzle, and to irradiate the tip of the suction nozzle with the ultraviolet rays.

In FIGS. 12A, 12B, 13A, 13B, and 14A to 14D used in the description of the present embodiment, the effect of refraction when the ultraviolet rays are incident on the reagent from the air is ignored.

(10) Tenth Embodiment

None of the first to ninth embodiments has a mechanism for stirring the reagent in the reagent vessel. On the contrary, in the present embodiment, the apparatus has a configuration provided with a mechanism for stirring the reagent in the reagent vessel.

When no mechanism is present to stir the reagent in the reagent vessel, depending on the arrangement and light distribution properties of the ultraviolet ray source, the shape of the reagent vessel, the positional relationship between the ultraviolet ray source and the suction nozzle, an ultraviolet irradiation dose per unit time emitted to the reagent in the reagent vessel differs depending on the position in the reagent vessel. Therefore, even at a position where the ultraviolet irradiation dose is the smallest, it is necessary to set the irradiation dose no less than the ultraviolet irradiation dose per unit liquid amount necessary for sterilization, and even at a position where the ultraviolet irradiation dose is the largest, it is necessary to set the irradiation dose no more than the ultraviolet irradiation dose corresponding to the upper limit of the allowable range of the change in the reagent properties. A time required for sterilization at a position where the ultraviolet irradiation dose is the smallest becomes a bottleneck of reagent sterilization time.

On the other hand, when the ultraviolet irradiation is performed while stirring, the reagent can be sterilized uniformly. For example, even if a shadow region due to a bottle shape is formed as shown in FIG. 14B, the reagent can be uniformly sterilized by ultraviolet irradiation while stirring. Further, as shown in FIGS. 6A, 6B, 8A, 8B, and 10, even when only a small portion of the reagents can be directly irradiated with the ultraviolet rays, the reagents can be uniformly sterilized by irradiating with ultraviolet rays while stirring. In addition, sterilization processing can be performed in shorter time than in the case of not stirring.

Examples of the stirring mechanism include a method in which a magnetic stirrer is disposed as a mounting table of a reagent vessel, a stirrer is placed in the reagent vessel, and the stirrer is rotated by using a magnetic force to stir the reagent. The stirring mechanism may be a stirring blade or a system in which suction and discharge of a reagent are repeated by a suction nozzle. It is desirable to adjust the rotation speed, the suction and discharge speed, and the position of the sterilizing mechanism such that, when stirring the reagent, a reagent liquid level that is rippled due to stirring does not touch the sterilizing mechanism.

(11) Other Embodiments

The invention is not limited to the above-described embodiments, and includes various modifications. For example, the above-described embodiments are described in detail for easy understanding of the invention, and do not necessarily have to include all the configurations described above. In addition, a part of one embodiment can be replaced with the configuration of another embodiment. Further, the configuration of another embodiment can be added to the configuration of one embodiment. In addition, a part of the configuration of each embodiment may be omitted.

REFERENCE SIGN LIST

1, 2, 3, 4, 5, 6, 7, 8 sterilizing mechanism
100 automatic analysis apparatus
101, 201, 301, 401, 501, 601, 701, 701A, 801, 901 reagent vessel
102, 202 suction nozzle
103, 103A, 103B ultraviolet LED
104 outer electrode
105 inner electrode
106 insulation portion
107 heat insulation portion
108, 208, 308A, 308B, 408A, 408B, 508, 608 fixing portion
109 insulation portion
110 heat insulation portion
111 analysis unit
112 control unit
112A storage unit
113 wiring
114 display unit
115, 215, 315, 415, 515, 615 circuit board
116, 216, 316 metal cylinder
117 electrode pad for supplying power
118 air hole
119 reagent storage unit
120 reagent dispensing mechanism
121 ultraviolet irradiation unit
122 reagent level
123, 123A, 123B perpendicular line of ultraviolet LED surface
124, 124A, 124B ultraviolet ray with half the maximum intensity
125 ultraviolet ray entering below mouth projection
126 dent in reagent vessel
127 shadow region
128 reflected or scattered ultraviolet rays

The invention claimed is:
1. An automatic analysis apparatus, comprising:
a reagent disk in which a plurality of reagent vessels holding a plurality of reagents are arranged, the plu- rality of reagent vessels including a first reagent vessel and the plurality of reagents including a first reagent;
a suction nozzle which sucks the first reagent held in the first reagent vessel positioned on the reagent disk in a reagent suction position;
an analysis unit which executes an analysis operation by adding the first reagent sucked from the first reagent vessel to a specimen via the suction nozzle;
a sterilizing mechanism detachably attached to each of the plurality of reagent vessels via a fixing portion and having an ultraviolet ray source which is configured to sterilize the first reagent by ultraviolet irradiation, and an electrode or a substrate as a power supply unit which is configured to supply electric power to the ultraviolet ray source, the ultraviolet ray source comprising a plurality of ultraviolet LEDs configured to emit ultraviolet rays having different wavelengths, each of which has a wavelength that sterilizes one of the plurality of reagents, wherein the plurality of ultraviolet LEDs are disposed in the fixing portion;
a heat insulation structure which is arranged between the sterilizing mechanism and the first reagent within the suction nozzle; and
a control unit configured to variably control an ultraviolet irradiation dose from each of the ultraviolet LEDs to be used in the ultraviolet irradiation of each of the plurality of reagents by controlling the wavelength and an emission time of an ultraviolet ray emitted from each of the ultraviolet LEDs into each of the plurality of reagent vessels from above a mouth thereof,
wherein the heat insulation structure is arranged between the sterilizing mechanism and the first reagent in the suction nozzle in order to heat-insulate the sterilizing mechanism from the first reagent in the suction nozzle.

2. The automatic analysis apparatus according to claim 1, wherein the sterilizing mechanism is detachably attached to the mouth or an air hole of the first reagent vessel.

3. The automatic analysis apparatus according to claim 1, wherein the heat insulation structure is, a resin or a rubber.

4. The automatic analysis apparatus according to claim 1, wherein the control unit is configured to variably control an ultraviolet irradiation dose by means of the ultraviolet ray source, by controlling either one or a combination of voltage, current, and energization time of the electric power to be supplied to the ultraviolet ray source in accordance with a reagent temperature in the suction nozzle.

5. The automatic analysis apparatus according to claim 1, further comprising:
a temperature sensor which measures a bonding temperature of each of the ultraviolet LEDs; and
wherein the control unit is configured to control an ultraviolet irradiation dose by controlling either one or a combination of voltage, current, and energization time of the electric power to be supplied to the ultraviolet ray source in accordance with the bonding temperature of each of the ultraviolet LEDs.

6. The automatic analysis apparatus according to claim 1, wherein the ultraviolet ray source emits ultraviolet rays having wavelengths in a range of 180 nm to 350 nm.

7. The automatic analysis apparatus according to claim 1, further comprising:
a stirring mechanism inside the first reagent vessel.

8. The automatic analysis apparatus according to claim 1, further comprising:
a display unit,
wherein the control unit causes the display unit to display a presence or absence of execution of appropriate sterilization, or to display abnormality detection.

9. The automatic analysis apparatus according to claim 1, wherein a part or all of portions other than a mouth and an air hole of the first reagent vessel are surrounded by an ultraviolet ray reflection member.

10. The automatic analysis apparatus according to claim 1, wherein a part or all of the plurality of ultraviolet LEDs are arranged at different angles with respect to a horizontal plane.

11. The automatic analysis apparatus according to claim 1, wherein the control unit is configured to variably control an ultraviolet irradiation dose by means of the ultraviolet ray source, by acquiring a liquid amount of a reagent based on a number of analysis executed by the analysis unit or a liquid level height detected by a liquid level detection mechanism.

12. The automatic analysis apparatus according to claim 11, wherein the control unit is configured to control an ultraviolet irradiation dose by controlling either one or a combination of voltage, current, and energization time of the electric power to be supplied to the ultraviolet ray source in accordance with a remaining amount of a reagent remaining in the first reagent vessel.

13. The automatic analysis apparatus according to claim 1, wherein the fixing portion is connected to the power supply unit and is configured to release heat from the sterilizing mechanism, and
wherein the fixing portion is disposed at a position not being immersed in the reagent, and the heat insulation structure includes a first heat insulator that is arranged between, and in contact with, the fixing portion and the suction nozzle.

14. The automatic analysis apparatus according to claim 13, wherein the first heat insulator is a resin or a rubber.

15. The automatic analysis apparatus according to claim 13, wherein the heat insulation structure includes a second heat insulator arranged between the power supply and the suction nozzle.

16. The automatic analysis apparatus according to claim 15, wherein the second heat insulator is a resin or a rubber.

17. The automatic analysis apparatus according to claim 1, wherein the sterilizing mechanism is disposed at a position not being immersed in the reagent.

18. The automatic analysis apparatus according to claim 17, wherein the ultraviolet ray source is arranged in the first reagent vessel, in the vicinity of an opening of the first reagent vessel, and above a liquid level of the reagent.

19. The automatic analysis apparatus according to claim 18, wherein the ultraviolet ray source is arranged to surround the suction nozzle.

20. The automatic analysis apparatus according to claim 19, wherein the ultraviolet ray source and a plurality of peripheral members thereof are integrated with the suction nozzle.

* * * * *